(12) United States Patent
Muto et al.

(10) Patent No.: US 11,225,924 B2
(45) Date of Patent: Jan. 18, 2022

(54) IMBALANCE DETECTION DEVICE, IMBALANCE DETECTION SYSTEM, DATA ANALYSIS DEVICE, AND CONTROLLER FOR INTERNAL COMBUSTION ENGINE

(71) Applicant: TOYOTA JIDOSHA KABUSHIKI KAISHA, Toyota (JP)

(72) Inventors: Harufumi Muto, Miyoshi (JP); Akihiro Katayama, Toyota (JP); Kohei Mori, Toyota (JP); Yosuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/785,720

(22) Filed: Feb. 10, 2020

(65) Prior Publication Data
US 2020/0271069 A1 Aug. 27, 2020

(51) Int. Cl.
*F02D 41/14* (2006.01)
*F02D 41/00* (2006.01)
(Continued)

(52) U.S. Cl.
CPC ....... *F02D 41/1497* (2013.01); *F02D 41/009* (2013.01); *F02D 41/0085* (2013.01);
(Continued)

(58) Field of Classification Search
CPC .................................................. F02D 41/0085
See application file for complete search history.

(56) References Cited

U.S. PATENT DOCUMENTS 5,495,415 A * 2/1996 Ribbens ................. G01M 15/11
123/436
5,539,644 A 7/1996 Ichikawa et al.
(Continued)

FOREIGN PATENT DOCUMENTS

JP 57-126527 A 8/1982
JP 10-159637 A 6/1998
(Continued)

OTHER PUBLICATIONS

Notice of Allowance dated Nov. 25, 2020 in related U.S. Appl. No. 16/785,739.
(Continued)

*Primary Examiner* — Kevin R Steckbauer
(74) *Attorney, Agent, or Firm* — Oblon, McClelland, Maier & Neustadt, L.L.P.

(57) ABSTRACT

An imbalance detection device is provided. An obtainment process includes obtaining a rotation waveform variable based on a detection value of a sensor that detects a rotational behavior of a crankshaft, and an air-fuel ratio detection variable in each of a plurality of first intervals. A calculation process includes calculating an imbalance variable based on an output of a mapping having a value obtained by the obtainment process as an input. The imbalance variable indicates a degree of variations in an air-fuel ratio of the internal combustion engine. The rotation waveform variable indicates a difference between instantaneous speed variables that are variables corresponding to the rotational speed of the crankshaft in each of the second intervals.

25 Claims, 16 Drawing Sheets

(51) Int. Cl.

| | | |
|---|---|---|
| *F02D 41/38* | (2006.01) | |
| *F02D 41/26* | (2006.01) | |
| *F02D 41/24* | (2006.01) | |
| *F02M 26/14* | (2016.01) | |
| *F02M 26/17* | (2016.01) | |
| *F02M 26/65* | (2016.01) | |
| *B60K 15/03* | (2006.01) | |
| *F02B 75/18* | (2006.01) | |
| *F02M 25/08* | (2006.01) | |
| *F02M 35/10* | (2006.01) | |

(52) U.S. Cl.
CPC ..... *F02D 41/1405* (2013.01); *F02D 41/1454* (2013.01); *F02D 41/2438* (2013.01); *F02D 41/2454* (2013.01); *F02D 41/2461* (2013.01); *F02D 41/26* (2013.01); *F02D 41/38* (2013.01); *B60K 15/03* (2013.01); *F02B 75/18* (2013.01); *F02D 2200/101* (2013.01); *F02D 2200/1012* (2013.01); *F02M 25/0836* (2013.01); *F02M 25/0854* (2013.01); *F02M 25/0872* (2013.01); *F02M 26/14* (2016.02); *F02M 26/17* (2016.02); *F02M 26/65* (2016.02); *F02M 35/10222* (2013.01)

(56) References Cited

U.S. PATENT DOCUMENTS

| | | | | |
|---|---|---|---|---|
| 5,576,963 | A | | 11/1996 | Ribbens et al. |
| 5,687,692 | A | | 11/1997 | Togai et al. |
| 5,755,212 | A | * | 5/1998 | Ajima ............... F02D 41/1405 123/674 |
| 5,774,823 | A | * | 6/1998 | James .................. G01M 15/11 123/406.24 |
| 6,092,017 | A | * | 7/2000 | Ishida ................ F02D 41/1404 701/106 |
| 6,292,738 | B1 | * | 9/2001 | Feldkamp ............. G01M 15/11 701/106 |
| 9,752,517 | B2 | * | 9/2017 | Rollinger ............. F02D 31/001 |
| 10,054,074 | B2 | * | 8/2018 | Nakano ............... F02D 41/221 |
| 10,330,040 | B2 | * | 6/2019 | Surnilla ............. F02D 41/3076 |
| 10,844,803 | B2 | * | 11/2020 | Muto ................ F02M 25/0836 |
| 10,969,304 | B2 | * | 4/2021 | Hashimoto ............ G01M 15/11 |
| 11,099,102 | B2 | * | 8/2021 | Muto .................. G06N 3/0481 |
| 2003/0163242 | A1 | | 8/2003 | Miyauchi et al. |
| 2012/0192633 | A1 | | 8/2012 | Hakariya et al. |
| 2013/0184969 | A1 | * | 7/2013 | Rollinger ............... F02D 41/22 701/103 |
| 2015/0026061 | A1 | | 9/2015 | Shiwa |
| 2016/0299035 | A1 | | 10/2016 | Choi |
| 2017/0067405 | A1 | * | 3/2017 | Nakano .................. G01M 15/11 |
| 2017/0356380 | A1 | * | 12/2017 | Surnilla ................. F02D 13/06 |
| 2019/0271278 | A1 | * | 9/2019 | Surnilla .............. F02D 41/3076 |
| 2020/0263617 | A1 | * | 8/2020 | Hashimoto ............. F02D 41/22 |
| 2020/0263624 | A1 | * | 8/2020 | Muto ................. F02D 41/1497 |
| 2020/0264074 | A1 | * | 8/2020 | Hashimoto ......... F02D 41/1498 |
| 2020/0300193 | A1 | * | 9/2020 | Muto ................. F02M 25/0872 |
| 2021/0033039 | A1 | * | 2/2021 | Hashimoto ......... F02D 41/2454 |
| 2021/0033040 | A1 | * | 2/2021 | Hashimoto ......... F02D 41/0085 |
| 2021/0047973 | A1 | * | 2/2021 | Martin .................... F02D 37/02 |

FOREIGN PATENT DOCUMENTS

| | | |
|---|---|---|
| JP | 10-252536 A | 9/1998 |
| JP | 2000-220489 A | 8/2000 |
| JP | 2004-52620 A | 2/2004 |
| JP | 2006-207476 A | 8/2006 |
| JP | 2012-47089 A | 3/2012 |
| JP | 2012-154300 A | 8/2012 |
| JP | 2013-194685 A | 9/2013 |
| JP | 2015-169191 A | 9/2015 |
| JP | 2017-155712 A | 9/2017 |
| JP | 2018-135844 A | 8/2018 |
| WO | WO 2014/069194 A1 | 5/2014 |

OTHER PUBLICATIONS

Indian Office Action dated Aug. 31, 2020 in Patent Application No. 202014005518, 5 pages.

Non-final Office Action dated Jun. 22, 2021 in U.S. Appl. No. 16/785,760.

Notice of Allowance dated Oct. 6, 2021 in related U.S. Appl. No. 16/785,760.

* cited by examiner

IMBALANCE DETECTION DEVICE, IMBALANCE DETECTION SYSTEM, DATA ANALYSIS DEVICE, AND CONTROLLER FOR INTERNAL COMBUSTION ENGINE

BACKGROUND

1. Field

The present disclosure relates to an imbalance detection device, an imbalance detection system, a data analysis device, and a controller for an internal combustion engine.

2. Description of Related Art

For example, Japanese Laid-Open Patent Publication No. 2013-194685 discloses a device that detects imbalance, which is the variation in actual air-fuel ratios when fuel injection valves are operated to control the air-fuel ratios of the air-fuel mixture in cylinders to air-fuel ratios equal to each other. The device identifies a cylinder in which the air-fuel ratio is deviated from the intended one based on, in addition to the difference value of the detection value of the air-fuel ratio sensor, an air-fuel ratio estimation model in which the detection value is an input.

The imbalance includes a phenomenon of shifting toward the rich side from the intended air-fuel ratio and a phenomenon of shifting toward the lean side. The inventors found that the behavior of the detection value of the air-fuel ratio sensor is approximate between the imbalance shifted toward the rich side and the imbalance shifted toward the lean side, in which case, it may become difficult to identify how the air-fuel ratio of any cylinder is shifted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

An imbalance detection device applied to a multi-cylinder internal combustion engine, the imbalance detection device comprising:
 a storage device; and
 an execution device, wherein
 the storage device is configured to store mapping data that is data defining a mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine,
 the execution device is configured to execute
 an obtainment process of obtaining the rotation waveform variable based on a detection value of a sensor that detects a rotational behavior of a crankshaft, and the air-fuel ratio detection variable in each of a plurality of first intervals,
 a calculation process of calculating the imbalance variable based on an output of the mapping having a value obtained by the obtainment process as the input, and
 a response process of operating predetermined hardware based on a calculation result of the calculation process to respond to a large degree of variations in the air-fuel ratio,
 the rotation waveform variable is a variable indicating a difference between instantaneous speed variables that are variables corresponding to a rotational speed of the crankshaft in each of a plurality of second intervals,
 the first interval and the second interval are both angular intervals of the crankshaft smaller than an appearance interval of a compression top dead center, and
 the rotation waveform variables and the air-fuel ratio detection variables, which are inputs to the mapping, are respectively time series data within a predetermined angular interval larger than the appearance interval.

In the configuration described above, the rotation waveform variable is used in addition to the air-fuel ratio detection variable in each of the first intervals. The rotation waveform variable is obtained by quantifying the rotational behavior that occurs according to the torque generated in the combustion chamber of each cylinder. Therefore, the rotation waveform variable has sensitivity to the difference in the air-fuel ratio of the air-fuel mixture. Therefore, for example, depending on the air-fuel ratio detection variable in each of the first intervals, even if it is difficult to identify how the air-fuel ratio of which cylinder is deviated, it is possible to identify how the air-fuel ratio of which cylinder is deviated by taking into account the rotation waveform variable.

Example 2

The imbalance detection device according to Example 1, wherein
 the input to the mapping includes a half order component of a rotation frequency of the crankshaft based on the detection value of the sensor that detects the rotational behavior of the crankshaft,
 the obtainment process includes a process of obtaining a half order component variable that is a variable defining the half order component, and
 the calculation process is a process of calculating the imbalance variable based on the output of the mapping in which the half order component variable obtained by the obtainment process is further included in the input to the mapping.

It can be considered that a linear relationship is established between the imbalance ratio and the half order amplitude which is the magnitude of the half order component of the rotation frequency. Furthermore, the inventors have found that the half order component is particularly large in the amplitude of the rotation frequency when imbalance exists. This is considered to be because when the imbalance occurs in any one of cylinders, shift occurs in the generated torque once in one combustion cycle. In the configuration described above, focusing on such a point, the imbalance variable can be calculated with higher accuracy by including the half order component variable in the input to the mapping.

Example 3

The imbalance detection device according to Example 1 or 2, wherein the input to the mapping includes an operating point variable that is a variable defining an operating point of the internal combustion engine, the obtainment process includes a process of obtaining the operating point variable, and the calculation process is a process of calculating the imbalance variable based on the output of the mapping in which the operating point variable obtained by the obtainment process is further included in the input to the mapping.

The control of the internal combustion engine tends to be performed according to the operating point of the internal combustion engine. Thus, the rotational behavior of the crankshaft may vary depending on the operating point of the internal combustion engine. Therefore, in the configuration described above, the imbalance variable can be calculated while reflecting that the rotational behavior of the crankshaft varies depending on the operating point by including the operating point variable of the internal combustion engine in the input to the mapping.

Example 4

The imbalance detection device according to any one of Examples 1 to 3, wherein the input to the mapping includes moderator variables that are variables for adjusting a combustion speed of air-fuel mixture in a combustion chamber of the internal combustion engine by an operation of an operation portion of the internal combustion engine, the obtainment process includes a process of obtaining the moderator variable, and the calculation process is a process of calculating the imbalance variable based on the output of the mapping in which the moderator variable obtained by the obtainment process is further included in the input to the mapping.

The rotational behavior of the crankshaft changes depending on the combustion speed of the air-fuel mixture. Therefore, in the configuration described above, an moderator variable for adjusting the combustion speed is included in the input to the mapping. The imbalance variable thus can be calculated while reflecting that the rotational behavior of the crankshaft changes according to the combustion speed.

Example 5

The imbalance detection device according to any one of Examples 1 to 4, wherein the input to the mapping includes a driveline system state variable that is a variable indicating a state of a driveline system connected to the crankshaft, the obtainment process includes a process of obtaining the driveline system state variable, and the calculation process is a process of calculating the imbalance variable based on the output of the mapping in which the driveline system state variable obtained by the obtainment process is further included in the input to the mapping.

When the state of the driveline system connected to the crankshaft is different, the rotational behavior of the crankshaft tends to be different. Therefore, in the configuration described above, the imbalance variable can be calculated while reflecting that the rotational behavior of the crankshaft varies according to the state of the driveline system by including the driveline system state variable in the input to the mapping.

Example 6

The imbalance detection device according to any one of Examples 1 to 5, wherein the input to the mapping includes a road surface state variable that is a variable indicating a state of a road surface on which a vehicle to which the internal combustion engine is mounted travels, the obtainment process includes a process of obtaining the road surface state variable, and the calculation process is a process of calculating the imbalance variable based on the output of the mapping in which the road surface state variable obtained by the obtainment process is further included in the input to the mapping.

For example, when the road surface is uneven, the vehicle is vibrated and the vibration is transmitted to the crankshaft. Thus, the road surface state affects the rotational behavior of the crankshaft. Therefore, in the configuration described above, the imbalance variable can be calculated while reflecting that the rotational behavior of the crankshaft varies according to the road surface state by including the road surface state variable in the input to the mapping.

Example 7

The imbalance detection device according to any one of Examples 1 to 6, wherein the rotation waveform variable is configured as a variable indicating a difference between the instantaneous speed variables by the instantaneous speed variable in each of the second intervals, the obtainment process includes a process of obtaining the instantaneous speed variable in each of the second intervals as the rotation waveform variable, and the calculation process is a process of calculating the imbalance variable by having the instantaneous speed variable in each of the second intervals as the input to the mapping as the rotation waveform variable.

When calculating the difference or ratio between the instantaneous speed variables, it is necessary to separately perform fitting in which two second intervals the difference or ratio between the instantaneous speed variables should be calculated. In the configuration described above, instantaneous speed variables are used as the rotation waveform variables. Therefore, for example, the fitting time of the rotation waveform variable can be reduced as compared with a case where a difference or ratio between instantaneous speed variables is calculated in advance and input to the mapping.

Example 8

The imbalance detection device according to any one of Examples 1 to 7, wherein the storage device includes a plurality of types of the mapping data, and the calculation process includes a selection process of selecting the mapping data to be used for calculating the imbalance variable from the plurality of types of mapping data.

For example, when configuring a mapping that can output imbalance variables with higher accuracy in any situation, the structure of the mapping is likely to be complicated.

Therefore, in the configuration described above, a plurality of types of mapping data are provided. An appropriate mapping can be selected according to the situation. In this case, for example, the structure of each of a plurality of types of mappings can be easily simplified as compared with a case where all situations are handled with a single mapping.

Example 9

The imbalance detection device according to any one of Examples 1 to 8, wherein
the internal combustion engine includes
a canister that collects fuel vapor in a fuel tank that stores fuel to be injected from a fuel injection valve,
a purge passage that connects the canister and an intake passage of the internal combustion engine to each other, and
an adjustment device for adjusting a flow rate of the fuel vapor flowing from the canister into the intake passage through the purge passage,
the calculation process includes both of
a process of calculating the imbalance variable by having data obtained by the obtainment process when the flow rate of the fuel vapor is zero as the input to the mapping, and
a process of calculating the imbalance variable by having data obtained by the obtainment process when the flow rate of the fuel vapor is greater than zero as the input to the mapping, and
the response process is a process of, when the flow rate of the fuel vapor is greater than zero, operating the predetermined hardware based on the imbalance variable calculated by having the data obtained by the obtainment process when the flow rate of the fuel vapor is greater than zero as the input to the mapping.

Example 10

The imbalance detection device according to any one of Examples 1 to 8, wherein
the internal combustion engine includes
a canister that collects fuel vapor in a fuel tank that stores fuel to be injected from a fuel injection valve,
a purge passage that connects the canister and an intake passage of the internal combustion engine to each other, and
an adjustment device for adjusting a flow rate of the fuel vapor flowing from the canister into the intake passage through the purge passage,
the calculation process includes both of
a process of calculating the imbalance variable by having data obtained by the obtainment process when the flow rate of the fuel vapor is zero as the input to the mapping, and calculating a first learned value from the imbalance variable and storing the first learned value, and
a process of calculating the imbalance variable by having data obtained by the obtainment process when the flow rate of the fuel vapor is greater than zero as the input to the mapping, and calculating a second learned value from the imbalance variable and storing the second learned value, and
the response process is a process of, when the flow rate of the fuel vapor is zero, operating the predetermined hardware by selectively using the first learned value of the stored first learned value and the second learned value.

When the flow rate of the fuel vapor is greater than zero, the fuel vapor flows from the canister into the intake passage and flows into each cylinder. However, the inflow amount of fuel vapor into each cylinder varies. This variation cannot be expressed by an imbalance variable in which the variation caused by individual differences, aging degradation, or the like of the fuel injection valve is quantified. Therefore, in the configuration described above, the imbalance variable corresponding to the presence or absence of the influence of the fuel vapor is calculated separately. Thus, it is possible to grasp the imbalance caused by individual differences or aging degradation of the fuel injection valve and the imbalance caused by the fuel vapor, and furthermore, measures corresponding to the situation can be taken.

Example 11

The imbalance detection device according to any one of Examples 1 to 8, wherein
the internal combustion engine includes
an EGR passage that connects an exhaust passage and an intake passage, and
an EGR valve that adjusts a flow rate of the exhaust gas flowing in from the exhaust passage into the intake passage through the EGR passage,
the calculation process includes both of
a process of calculating the imbalance variable by having data obtained by the obtainment process when the flow rate of the exhaust gas flowing into the intake passage is zero as the input to the mapping, and
a process of calculating the imbalance variable by having data obtained by the obtainment process when the flow rate of the exhaust gas flowing into the intake passage is greater than zero as the input to the mapping, and
the response process is a process of, when the flow rate of the exhaust gas flowing into the intake passage is greater than zero, operating the predetermined hardware based on the imbalance variable calculated by having the data obtained by the obtainment process when the flow rate of the exhaust gas flowing into the intake passage is greater than zero as the input to the mapping.

Example 12

The imbalance detection device according to any one Examples 1 to 8, wherein the internal combustion engine includes
an EGR passage that connects an exhaust passage and an intake passage; and
an EGR valve that adjusts a flow rate of the exhaust gas flowing in from the exhaust passage into the intake passage through the EGR passage,
the calculation process includes both of
a process of calculating the imbalance variable by having data obtained by the obtainment process when the flow rate of the exhaust gas flowing into the intake passage is zero as the input to the mapping, and calculating a first learned value, from the imbalance variable and storing the first learned value: and
a process of calculating the imbalance variable by having data obtained by the obtainment process when the flow rate of the exhaust gas flowing into the intake passage is greater than zero as the input to the mapping, and calculating a second learned value from the imbalance variable and storing the second learned value, and
the response process is a process of, when the flow rate of the exhaust gas flowing into the intake passage is zero, operating the predetermined hardware by selectively using the first learned value of the stored first learned value, and second learned value.

When the flow rate of the exhaust gas flowing into the intake passage is greater than zero, the exhaust gas flows into the intake passage from the exhaust passage through the EGR passage, and flows into each cylinder. However, the inflow amount of exhaust air into each cylinder varies. The variation in the combustion state of the air-fuel mixture in each cylinder due to this variation cannot be expressed by an imbalance variable in which the variation caused by individual differences, aging degradation or the like of the fuel injection valve is quantified. Therefore, in the configuration described above, the imbalance variable corresponding to the presence or absence of the influence of the exhaust gas flowing into the intake passage is calculated separately. Thus, it is possible to grasp the imbalance caused by individual differences or aging degradation of the fuel injection valve and the imbalance caused by the exhaust gas flowing into the intake passage, and furthermore, measures corresponding to the situation can be taken.

Example 13

The imbalance detection device according to any one of Examples 1 to 12, wherein
the predetermined hardware includes a combustion operation portion for controlling the combustion of the air-fuel mixture in the combustion chamber of the internal combustion engine, and
the response process includes an operation process of operating the combustion operation portion according to the imbalance variable when the degree of variations in the air-fuel ratio is large.

In the configuration described above, the operation portion for controlling the combustion of the air-fuel mixture is operated according to the imbalance variable. Therefore, the deterioration of the combustion state caused by the large variation in the air-fuel ratio can be improved.

Example 14

The imbalance detection device according to Example 13, wherein the operation process includes a process of operating the fuel injection valve serving as the combustion operation portion for supplying fuel to each of a plurality of cylinders.

In the configuration described above, the variation in the air-fuel ratio of the air-fuel mixture of each cylinder can be reduced by correcting the injection amount in accordance with the imbalance variable.

Example 15

An imbalance detection system comprising the execution device and the storage device according to any one of Examples 1 to 14, wherein
the execution device includes a first execution device and a second execution device,
the first execution device is mounted to a vehicle, and is configured to execute
the obtainment process,
a vehicle-side transmission process for transmitting the data obtained by the obtainment process to the outside of the vehicle,
a vehicle-side reception process for receiving a signal based on the calculation result of the calculation process, and
the response process, and
the second execution device is disposed outside the vehicle and is configured to execute
an external reception process for receiving the data transmitted by the vehicle-side transmission process,
the calculation process, and
an external transmission process for transmitting a signal based on the calculation result of the calculation process to the vehicle.

In the configuration described above, the calculation process is executed outside the vehicle. The computation load of the in-vehicle device thus can be reduced.

Example 16

A data analysis device comprising:
the second execution device according to Example 15; and
the storage device according to Example 15.

Example 17

A controller for an internal combustion engine, the controller comprising the first execution device according to Example 15.

Example 18

An imbalance detection system including a first execution device, a second execution device, and a storage device, wherein
the storage device is configured to store mapping data that is data defining a mapping, the mapping having a rotation waveform variable and an air-fuel ratio detection variable as an input, the air-fuel ratio detection variable being a variable corresponding to an output of an air-fuel ratio sensor in each of first intervals, and the mapping outputting an imbalance variable that is a variable indicating a degree of variations in an air-fuel ratio of a multi-cylinder internal combustion engine,
the first execution device is mounted to a vehicle, and is configured to execute,
an obtainment process of obtaining the rotation waveform variable based on a detection value of a sensor that detects a rotational behavior of a crankshaft, and the air-fuel ratio detection variable in each of a plurality of first intervals,
a vehicle-side transmission process for transmitting the data obtained by the obtainment process to the outside of the vehicle,
a vehicle-side reception process for receiving a signal based on the calculation result of a calculation process, and
a response process of operating a predetermined hardware based on a calculation result of the calculation process to respond to a large degree of variations in the air-fuel ratio, and
the second execution device is disposed outside the vehicle and is configured to execute,
an external reception process for receiving the data transmitted by the vehicle-side transmission process,
a calculation process of calculating the imbalance variable based on an output of the mapping having a value obtained by the obtainment process as the input, and an external transmission process for transmitting a signal based on the calculation result of the calculation process to the vehicle, the rotation waveform variable is a variable indicating a difference between instantaneous speed variables that are variables corresponding to a rotational speed of the crankshaft in each of a plurality of second intervals, the first interval and the second interval are both angular intervals of the crankshaft smaller than an appearance interval of a compression top dead center, and the rotation waveform variables and the air-fuel ratio detection variables that are inputs to the mapping are respectively time series data within a predetermined angular interval larger than the appearance interval.

Example 19

An imbalance detection method applied to a multi-cylinder internal combustion engine, the method including the processes according to any one of Examples 1 to 18.

Example 20

A non-transitory computer-readable storage medium storing a program for causing an execution device to execute the process according to any one of Examples 1 to 18.

Example 21

In any one of Examples 1 to 20, the imbalance variable is a variable indicating a variation degree between the actual air-fuel ratios when a fuel injection valve of the internal combustion engine is operated to control the air-fuel ratios of the air-fuel mixture in cylinders to air-fuel ratios equal to each other.

Example 22

In Example 5, the driveline system state variable is a variable indicating the state of a transmission connected to the crankshaft, or a variable indicating the state of a lockup clutch.

Example 23

In any one of Examples 1 to 22, the mapping data includes data learned by machine learning.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment of an imbalance detection device will be described with reference to FIGS. 1 to 8B.

Figure 1:
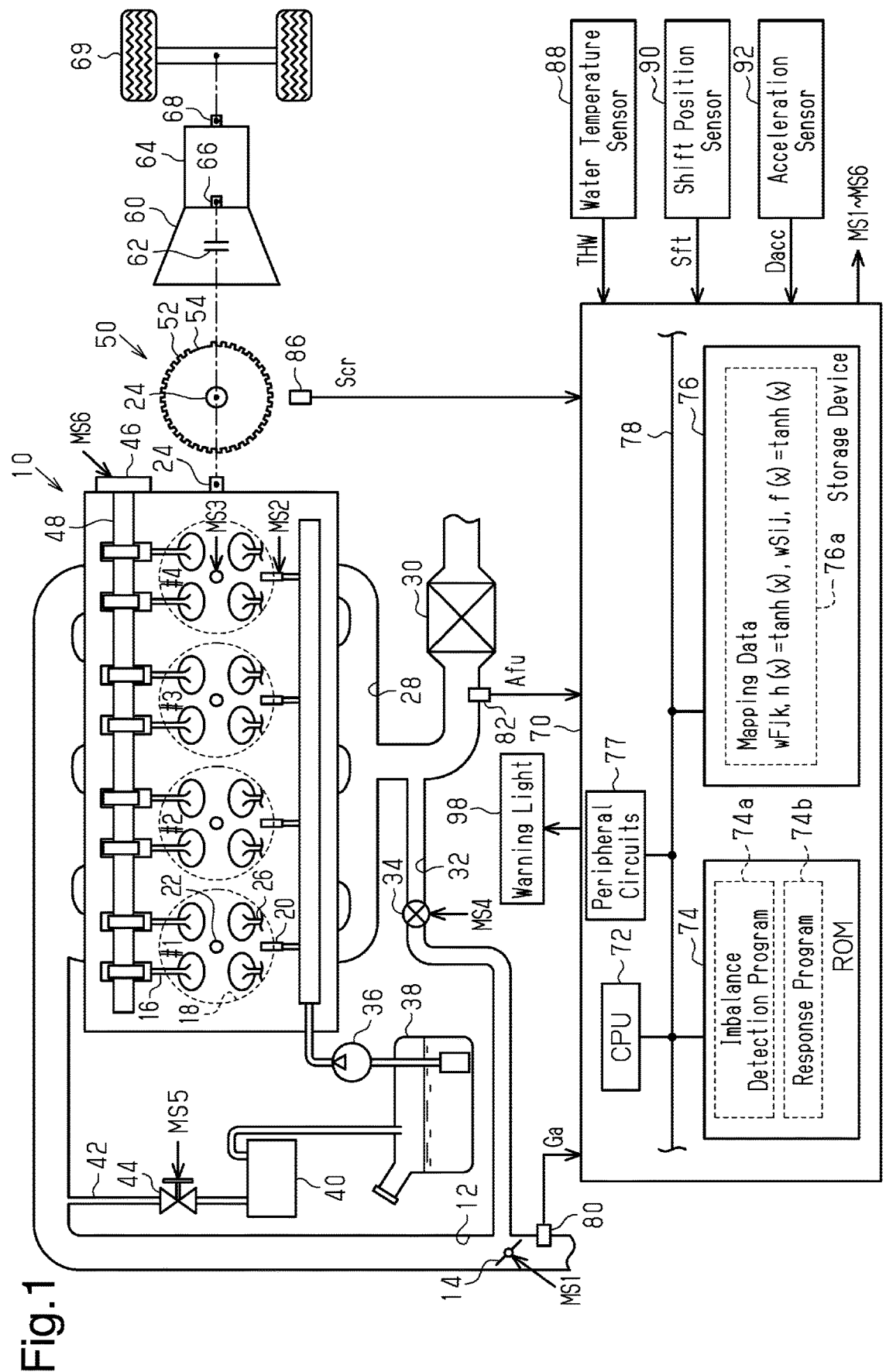
FIG. 1 is a diagram showing a configuration of a controller and a driveline system of a vehicle according to a first embodiment.

In an internal combustion engine 10 mounted to a vehicle VC shown in FIG. 1, a throttle valve 14 is provided in an intake passage 12. The air taken in from the intake passage 12 flows into combustion chambers 18 of the respective cylinders #1 to #4 when an intake valve 16 is opened. The internal combustion engine 10 is provided with a fuel injection valve 20 that injects fuel, and an ignition device 22 that generates spark discharge so as to be exposed to the combustion chamber 18. In the combustion chamber 18, the air-fuel mixture is subjected to combustion, and the energy generated by the combustion is extracted as rotational energy of a crankshaft 24. The air-fuel mixture subjected to combustion is discharged to an exhaust passage 28 as exhaust gas accompanying the opening of an exhaust valve 26. The exhaust passage 28 is provided with a catalyst 30 having oxygen storage capacity. The exhaust passage 28 is communicated with the intake passage 12 through an EGR passage 32. The EGR passage 32 is provided with an EGR valve 34 for adjusting the flow passage cross-sectional area.

The fuel stored in a fuel tank 38 is supplied to the fuel injection valve 20 through a pump 36. The fuel vapor generated in the fuel tank 38 is collected in a canister 40. The canister 40 is connected to the intake passage 12 through a purge passage 42, and the flow passage cross-sectional area of the purge passage 42 is adjusted by a purge valve 44.

The rotational force of the crankshaft 24 is transmitted to the intake side camshaft 48 through an intake variable valve timing system 46. The intake variable valve timing system 46 changes the relative rotational phase difference between the intake side camshaft 48 and the crankshaft 24.

An input shaft 66 of a transmission 64 can be connected to the crankshaft 24 of the internal combustion engine 10 through a torque converter 60. The torque converter 60 includes a lockup clutch 62, and when the lockup clutch 62 is in an engaged state, the crankshaft 24 and the input shaft 66 are connected. Drive wheels 69 are mechanically connected to the output shaft 68 of the transmission 64. In the present embodiment, the transmission 64 is a stepped transmission that can change a transmission gear ratio from the first gear to the fifth gear.

A crank rotor 50 provided with teeth 52 each indicating rotational angles of the crankshaft 24 is coupled to the crankshaft 24. In the present embodiment, 34 teeth 52 are illustrated. The crank rotor 50 is basically provided with teeth 52 at intervals of 10° CA, but has one missing-teeth part 54 where the interval between adjacent teeth 52 is 30° CA. This is to indicate the rotational angle that serves as a reference for the crankshaft 24.

A controller 70 controls the internal combustion engine 10, and operates operation portions of the internal combustion engine 10 such as the throttle valve 14, the fuel injection valve 20, the ignition device 22, the EGR valve 34, the purge valve 44, the intake variable valve timing system 46, and the like to control controlled variables such as the torque, the exhaust component ratio, and the like. FIG. 1 describes the operation signals MS1 to MS6 of the throttle valve 14, the fuel injection valve 20, the ignition device 22, the EGR valve 34, the purge valve 44, and the intake variable valve timing system 46, respectively.

When controlling the controlled variables, the controller 70 references an intake air amount Ga detected by an air flowmeter 80, an upstream detection value Afu detected by an air-fuel ratio sensor 82 provided upstream of the catalyst 30, an output signal Scr of a crank angle sensor 86 that outputs a pulse for every angular interval between the teeth 52 provided for every 10° CA excluding the missing-teeth part 54. Furthermore, the controller 70 references water temperature THW which is the temperature of the coolant of the internal combustion engine 10, detected by a water temperature sensor 88, a shift position Sft of the transmission 64 detected by a shift position sensor 90, and an acceleration Dacc in the vertical direction of a vehicle VC detected by an acceleration sensor 92.

The controller 70 includes a CPU 72, a ROM 74, a storage device 76 that is an electrically rewritable nonvolatile memory, and peripheral circuits 77, which can communicate with each other via a local network 78. The peripheral circuits 77 include a circuit that generates a clock signal defining an internal operation, a power supply circuit, a reset circuit, and the like.

The controller 70 executes control of controlled variables by the CPU 72 executing a program stored in the ROM 74.

Figure 2:
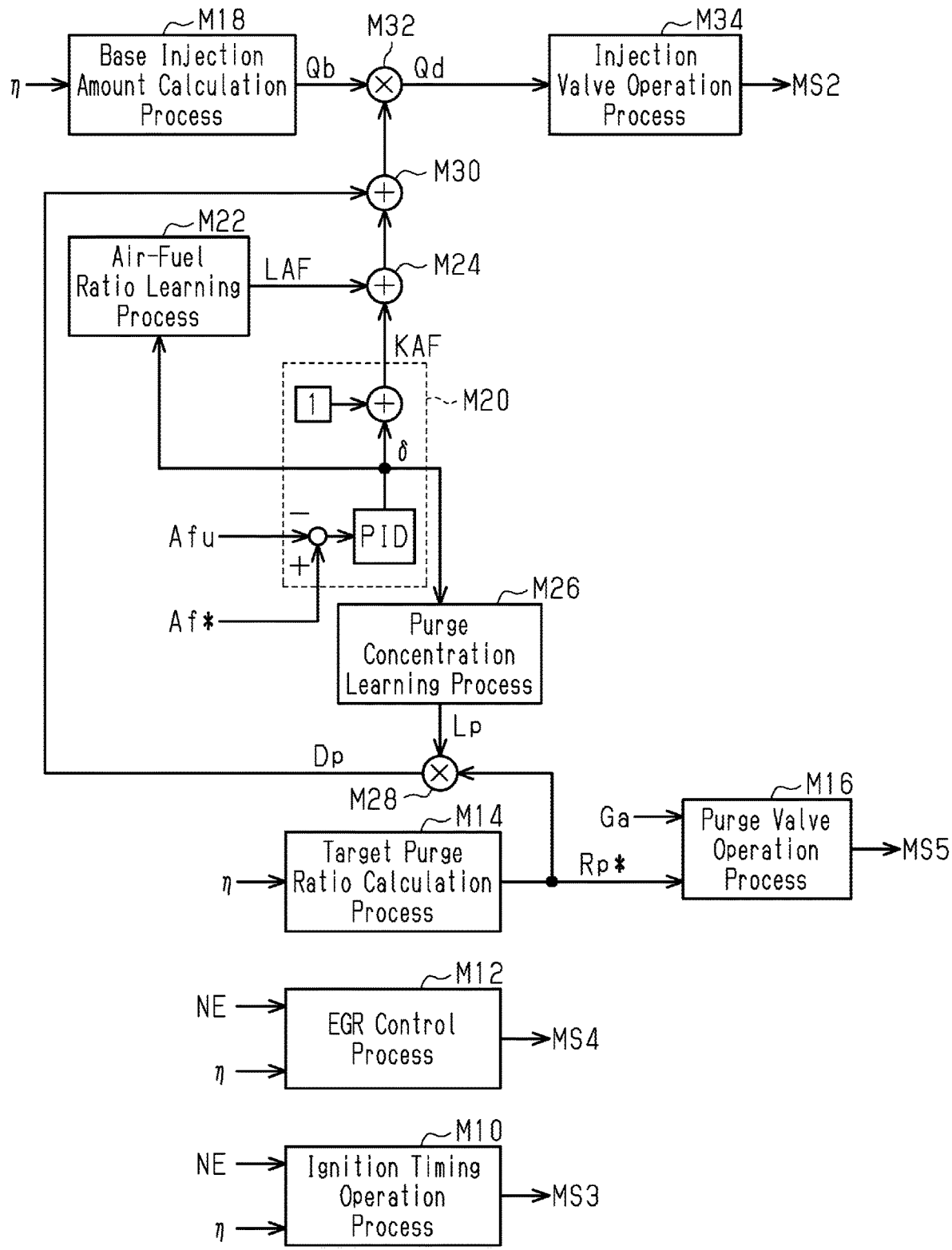
FIG. 2 is a block diagram showing a part of a process executed by the controller according to the first embodiment.

FIG. 2 shows a part of a process performed by the CPU 72 executing a program stored in the ROM 74.

An ignition timing operation process M10 is a process for setting a base value of an ignition timing based on a rotational speed NE that defines the operating point of the internal combustion engine 10 and the charging efficiency η, and operating the ignition device 22 by outputting an operation signal MS3 to the ignition device 22 so as to become an ignition timing aig corresponding thereto. Here, the charging efficiency η is a parameter indicating the amount of air charged into the combustion chamber 18, and is calculated by the CPU 72 based on the intake air amount Ga and the rotational speed NE. The rotational speed NE is calculated by the CPU 72 based on the output signal Scr of the crank angle sensor 86. The rotational speed NE is an average value of rotational speeds when the crankshaft 24 is rotated by an angular interval greater than the appearance interval of compression top dead center (180° CA in the present embodiment). The rotational speed NE is desirably an average value of the rotational speeds when the crankshaft 24 is rotated by a rotational angle of one or more rotations of the crankshaft 24. The average value here is not limited to a simple average, but may be, for example, exponential moving average process, and may be calculated by sampling values of the rotational speed at a minute rotational angular interval, for example, when the crankshaft 24 is rotated by the rotational angle of one or more rotations. However, this is not the sole case, and it may be calculated based on a single measurement value of the time required to rotate by a rotational angle of one or more rotations.

An EGR control process M12 is a process for operating the opening degree of the EGR valve 34 by outputting an operation signal MS4 to the EGR valve 34 to control an EGR ratio REGR ratio which is the proportion of the flow rate of the exhaust gas with respect to the sum of the flow rate of air taken into the intake passage 12 and the flow rate of the exhaust air that flowed into the intake passage 12 through the EGR passage 32 based on the operating point of the internal combustion engine 10.

A target purge ratio calculation process M14 is a process for calculating the target purge ratio Rp* based on the charging efficiency η. Here, the purge ratio is a value obtained by dividing the flow rate of the fluid flowing from the canister 40 into the intake passage 12 by the intake air amount Ga, and the target purge ratio Rp* is a target value of the purge ratio for control.

A purge valve operation process M16 is a process for outputting an operation signal MS5 to the purge valve 44 so as to operate the purge valve 44 so that the purge ratio becomes the target purge ratio Rp* based on the intake air amount Ga. Here, the purge valve operation process M16 is a process for setting the opening degree of the purge valve 44 to a smaller value as the intake air amount Ga becomes smaller when the target purge ratio Rp* is the same. This is because even if the pressure in the canister 40 is the same, the pressure in the intake passage 12 becomes lower as the intake air amount Ga becomes smaller and the pressure in the canister 40 becomes higher than the pressure in the intake passage 12, and hence the fluid easily flows into the intake passage 12 from the canister 40.

A base injection amount calculation process M18 is a process for calculating a base injection amount Qb based on the charging efficiency η. The base injection amount Qb is a base value of the fuel amount for making the air-fuel ratio of the air-fuel mixture in the combustion chamber 18 to the target air-fuel ratio. Specifically, for example, when the charging efficiency η is expressed as a percentage, the base injection amount calculation process M18 may be a process for calculating the base injection amount Qb by multiplying, by the charging efficiency η, the fuel amount QTH per 1% of the charging efficiency η for making the air-fuel ratio to the target air-fuel ratio. The base injection amount Qb is a fuel amount calculated to control the air-fuel ratio to the target air-fuel ratio based on the amount of air charged in the combustion chamber 18. The target air-fuel ratio may be, for example, a theoretical air-fuel ratio.

A feedback process M20 is a process for calculating a feedback correction coefficient KAF in which 1 is added to a correction ratio δ. The correction ratio δ is an operation amount for feedback controlling an upstream detection value Afu, which is a feedback control amount, to a target value Af*. The feedback correction coefficient KAF is a correction coefficient of the base injection amount Qb. Here, when the correction ratio δ is 0, the correction ratio of the base injection amount Qb is zero. Furthermore, when the correction ratio δ is greater than 0, the feedback process M20 increases and corrects the base injection amount Qb, and when the correction ratio δ is smaller than 0, the feedback process M20 decreases and corrects the base injection amount Qb. In the present embodiment, when a difference between the target value Af* and the upstream detection value Afu is input, the sum of the sum of the respective output values of the proportional element and the differentiation element, and the output value of the integrated element that outputs an integrated value of the value corresponding to the difference is set as the correction ratio δ.

An air-fuel ratio learning process M22 is a process for sequentially updating an air-fuel ratio learned value LAF so that the deviation between the correction ratio δ and 0 becomes small during the air-fuel ratio learning period. The air-fuel ratio learning process M22 includes a process for determining that the air-fuel ratio learned value LAF has converged when the amount of deviation from 0 of the correction ratio δ is less than or equal to a predetermined value.

A coefficient adding process M24 adds the air-fuel ratio learned value LAF to the feedback correction coefficient KAF.

A purge concentration learning process M26 is a process for calculating the purge concentration learned value Lp based on the correction ratio δ. The purge concentration learned value Lp is a value obtained by converting a correction ratio for correcting a deviation in the base injection amount Qb per 1% of the purge ratio. The correction ratio is for correcting the deviation of the base injection amount Qb with respect to the injection amount necessary for controlling the target air-fuel ratio due to the inflow of fuel vapor from the canister 40 to the combustion chamber 18. Here, in the present embodiment, all the factors that cause the feedback correction coefficient KAF to deviate from 1 when the target purge ratio Rp* is controlled to a value greater than 0 are assumed to be due to the fuel vapor that flowed in from the canister 40 to the combustion chamber 18. That is, the correction ratio δ is regarded as a correction ratio for correcting the deviation of the base injection amount Qb with respect to the injection amount necessary for controlling to the target air-fuel ratio due to the inflow of the fuel vapor from the canister 40 to the intake passage 12. However, since the correction ratio δ depends on the purge ratio, in the present embodiment, the purge concentration learned value Lp is set to an amount corresponding to the value δ/Rp per 1% of the purge ratio. Specifically, the purge concentration learned value Lp is set as the exponential moving average process value of the value δ/Rp per 1% of the purge ratio. It is desirable that the target purge ratio Rp* is a value greater than zero and the purge concentration learning process M26 is executed on the condition that determination is made that the air-fuel ratio learned value LAF has converged.

A purge correction ratio calculation process M28 is a process for calculating the purge correction ratio Dp by multiplying the target purge ratio Rp* by the purge concentration learned value Lp. The purge correction ratio Dp is a value less than or equal to zero.

A correction coefficient calculation process M30 is a process for adding the purge correction ratio Dp to the output value of the coefficient adding process M24.

A required injection amount calculation process M32 is a process for calculating the required injection amount Qd by correcting the base injection amount Qb by multiplying the base injection amount Qb by the output value of the correction coefficient calculation process M30.

An injection valve operation process M34 is a process for outputting an operation signal MS2 to the fuel injection valve 20 to operate the fuel injection valve 20 based on the required injection amount Qd.

Next, the process for detecting an imbalance in which the actual air-fuel ratio shifts between the cylinders when the fuel injection valves 20 in each of the cylinders #1 to #4 are operated based on the process in FIG. 2 will be described.

Figure 3:
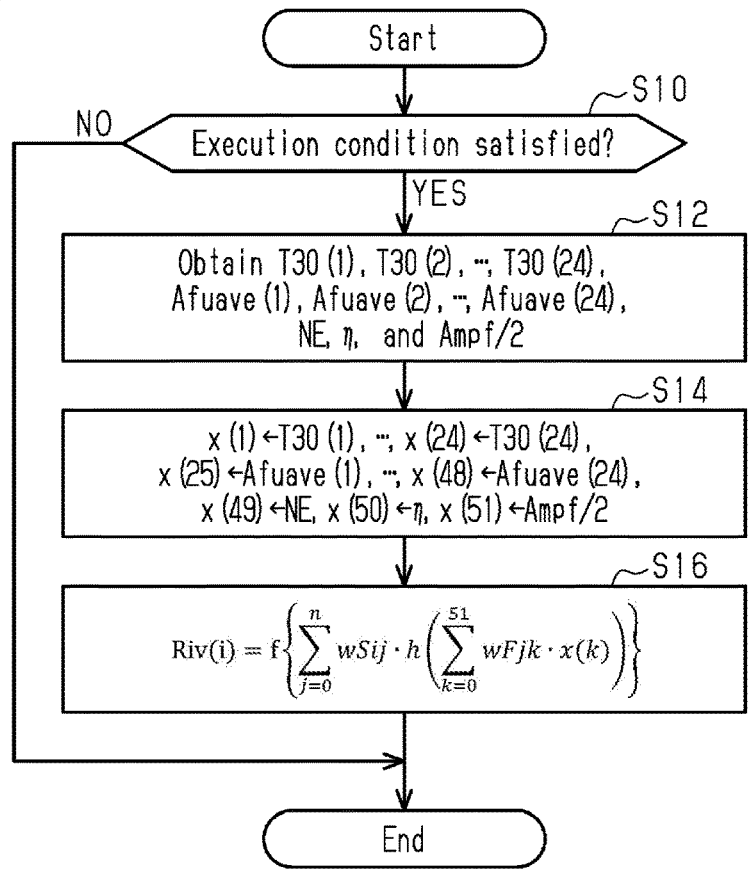
FIG. 3 is a flowchart showing a procedure of an imbalance detection process according to the embodiment.

FIG. 3 shows a procedure of a process related to the detection of an imbalance. The process shown in FIG. 3 is performed by the CPU 72 repeatedly executing an imbalance detection program 74a stored in the ROM 74 shown in FIG. 1, for example, at a predetermined cycle. Hereinafter, the step number of each process is represented by the number with S at the head.

In the series of processes shown in FIG. 3, the CPU 72 first determines whether the execution condition of the imbalance detection process is satisfied (S10). In the present embodiment, the execution condition includes a condition that the target purge ratio Rp* is zero and the EGR ratio Regr is zero.

Next, the CPU 72 obtains the minute rotation duration T30(1), T30(2), . . . , T30(24), the upstream-side average value Afuave(1), Afuave(2), . . . , Afuave(24), the rotational speed NE, the charging efficiency η, and the half order amplitude Ampf/2 (S12). Ampf/2 is the symbol for the half order amplitude. The minute rotation duration T30 is calculated by measuring the time required for the crankshaft 24 to rotate 30° CA based on the output signal Scr of the crank angle sensor 86 by the CPU 72. When the numbers in the parentheses differ, such as the minute rotation durations T30(1), T30(2), and the like, they indicate the different rotational angular intervals within 720° CA, which is one combustion cycle. That is, the minute rotation durations T30(1) to T30(24) indicate the rotation durations at the respective angular intervals obtained by equally dividing the rotational angle region of 720° CA (third interval) by 30° CA (fourth interval). That is, the minute rotation duration T30 is an instantaneous speed parameter serving as a parameter corresponding to the rotational speed when the crankshaft 24 rotates each of angular intervals (30° CA, that is, the fourth interval). Here, the third interval is a rotational angular interval of the crankshaft 24 and is an interval including the compression top dead center, and the fourth interval is an interval smaller than the appearance interval of the compression top dead center. The minute rotation duration T30 configures time series data which is an instantaneous speed parameter in each of consecutive fourth intervals included in the third interval.

Specifically, the CPU 72 measures the time required for the crankshaft 24 to rotate 30° CA based on the output signal Scr, and sets the same as an unfiltered duration NF30. Next, the CPU 72 calculates filtered duration AF30 by performing digital filtering with the unfiltered duration NF30 as an input. Then, the CPU 72 normalizes the filtered duration AF30 so that the difference between the local maximum (maximum value) and the local minimum (minimum value) of the filtered duration AF30 in a predetermined period (e.g., 720° CA) becomes 1 to calculate the minute rotation duration T30.

Furthermore, when m=1 to 24, the upstream-side average value Afuave(m) is the average value of the upstream detection values Afu at an angular interval of 30° CA same as each minute rotation duration T30(m).

The half order amplitude Ampf/2 is the intensity of the half order component of the rotation frequency of the crankshaft 24, and is calculated by the CPU 72 through Fourier transformation of the time series data of the minute rotation duration T30.

Next, the CPU 72 substitutes the value obtained by the process of S12 to the input variables x(1) to x(51) of the mapping that outputs the imbalance ratio Riv (S14). Specifically, assuming m=1 to 24, the CPU 72 substitutes the minute rotation duration T30(m) to the input variable x(m), substitutes the upstream-side average value Afuave(m) to the input variable (24+m), substitutes the rotational speed NE to the input variable x(49), substitutes the charging efficiency η to the input variable x(50), and substitutes the half order amplitude Ampf/2 to the input variable x(51).

In the present embodiment, the imbalance ratio Riv is 0 in the cylinder in which the fuel of the target injection amount is injected, and becomes a positive value when the actual injection amount is greater than the target injection amount and a negative value when actual injection amount is lesser. That is, the imbalance ratio Riv is an imbalance variable serving as a variable indicating the variation degree between the actual air-fuel ratios when the fuel injection valve 20 is operated to control the air-fuel ratio of the air-fuel mixture in each of the cylinders #1 to #4 to the same air-fuel ratio.

Next, the CPU 72 inputs the input variables x(1) to x(51) to the mapping defined by the mapping data 76a stored in the storage device 76 shown in FIG. 1 to calculate the respective imbalance ratios Riv(1) to Riv(4) of the cylinders #i(i=1 to 4) (S16). These imbalance ratios Riv(1) to Riv(4) can be grasped as variables indicating the degree of variations in the air-fuel ratio of the internal combustion engine 10.

In the present embodiment, this mapping is constituted by a neural network having one intermediate layer. The neural network includes an input-side coefficient wFjk (j=0 to n, k=0 to 51) and an activation function h(x). An input-side linear mapping is a linear mapping defined by the input-side coefficient wFjk, and the activation function h(x) is an input-side nonlinear mapping that nonlinearly converts each output of the input-side linear mapping. In the present embodiment, the activation function h(x) is exemplified by the hyperbolic tangent tan h(x). The neural network includes an output-side coefficient wSij (i=1 to 4, j=0 to n) and an activation function f(x). An output-side linear mapping is a linear mapping defined by the output-side coefficient wSij, and the activation function f(x) is an output-side nonlinear mapping that nonlinearly converts each output of the output-side linear mapping. In the present embodiment, the activation function f(x) is exemplified by the hyperbolic tangent tan h (x). The value n indicates the dimension of the intermediate layer.

When the process of S16 is completed or when a negative determination is made in the process of S10, the CPU 72 once terminates the series of processes shown in FIG. 3.

Figure 4:
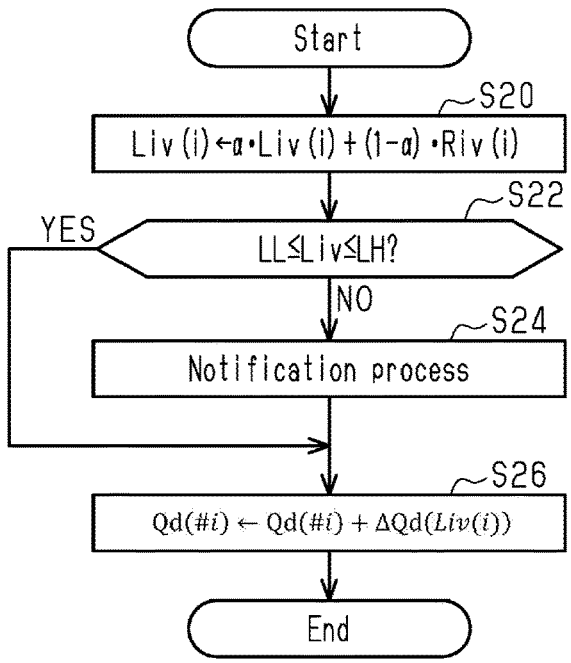
FIG. 4 is a flowchart showing a procedure of a response process for an imbalance according to the embodiment.

FIG. 4 shows a procedure of a process using the imbalance ratio Riv(i). The process shown in FIG. 4 is performed by the CPU 72 repeatedly executing a response program 74b stored in the ROM 74 shown in FIG. 1, for example, every time the imbalance ratio Riv(i) is calculated.

In the series of processes shown in FIG. 4, the CPU 72 first updates the imbalance learned value Liv(i) by an exponential moving average process having the imbalance ratio Riv(i) newly calculated by the process of FIG. 3 as an input (S20). That is, the CPU 72, for example, updates the imbalance learned value Liv by the sum of a value obtained by multiplying, by the coefficient α, the imbalance learned value Liv(i) stored in the storage device 76, and a value obtained by multiplying the imbalance ratio Riv(i) by 1−α (S20). Note that 0<α<1.

Next, the CPU 72 determines whether the imbalance learned value Liv(i) is greater than or equal to the permissible lean limit LL and less than or equal to the permissible rich limit LH (S22). When determining that the imbalance learned value Liv(i) is less than the permissible lean limit LL, or when determining that the imbalance learned value Liv(i) is greater than the permissible rich limit (S22: NO), the CPU 72 operates a warning light 98 to execute a notification process to prompt the user to repair the internal combustion engine 10 or the like (S24).

On the other hand, when determining that the imbalance learned value Liv(i) is greater than or equal to the permissible lean limit LL and less than or equal to the permissible rich limit LH (S22: YES), or when the process of S24 is completed, the CPU 72 corrects the required injection amount Qd (#i) of each cylinder (S26). That is, the CPU 72 corrects the required injection amount Qd(#i) by adding the correction amount ΔQd(Liv(i)) corresponding to the imbalance learned value Liv(i) to the required injection amount Qd(#i) of each cylinder. Here, the correction amount ΔQd (Liv(i)) is a negative value when the imbalance learned value Liv(i) is greater than zero, and is a positive value when the imbalance learned value Liv(i) is smaller than zero. When the imbalance learned value Liv(i) is zero, the correction amount ΔQd(Liv(i)) is also zero.

When the process of S26 is completed, the CPU 72 once terminates the series of processes shown in FIG. 4. In the present embodiment, when an affirmative determination is made in the process of S10 and the process of S12 is executed, the process of S26 is temporarily stopped.

Next, a method for generating the mapping data 76a will be described.

Figure 5:
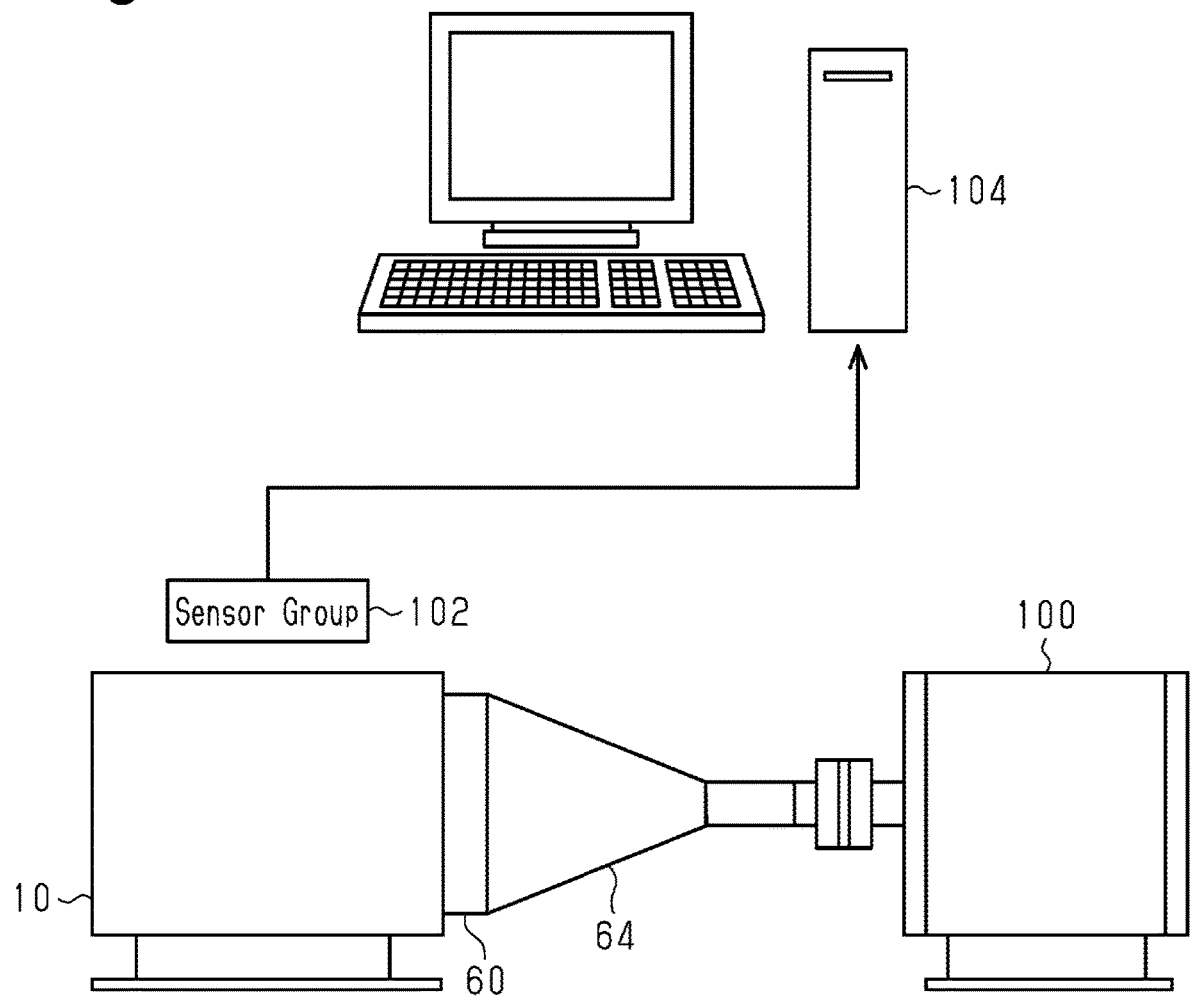
FIG. 5 is a diagram showing a system for generating mapping data according to the embodiment.

FIG. 5 shows a system for generating the mapping data 76a.

As shown in FIG. 5, in the present embodiment, a dynamometer 100 is mechanically connected to the crankshaft 24 of the internal combustion engine 10 through a torque converter 60 and a transmission 64. Various state variables when the internal combustion engine 10 is operated are detected by the sensor group 102, and the detection results are input to an fitting device 104, which is a computer that generates the mapping data 76a. The sensor group 102 includes an air flowmeter 80 which is a sensor for detecting a value for generating an input to the mapping, an air-fuel ratio sensor 82, and a crank angle sensor 86.

Figure 6:
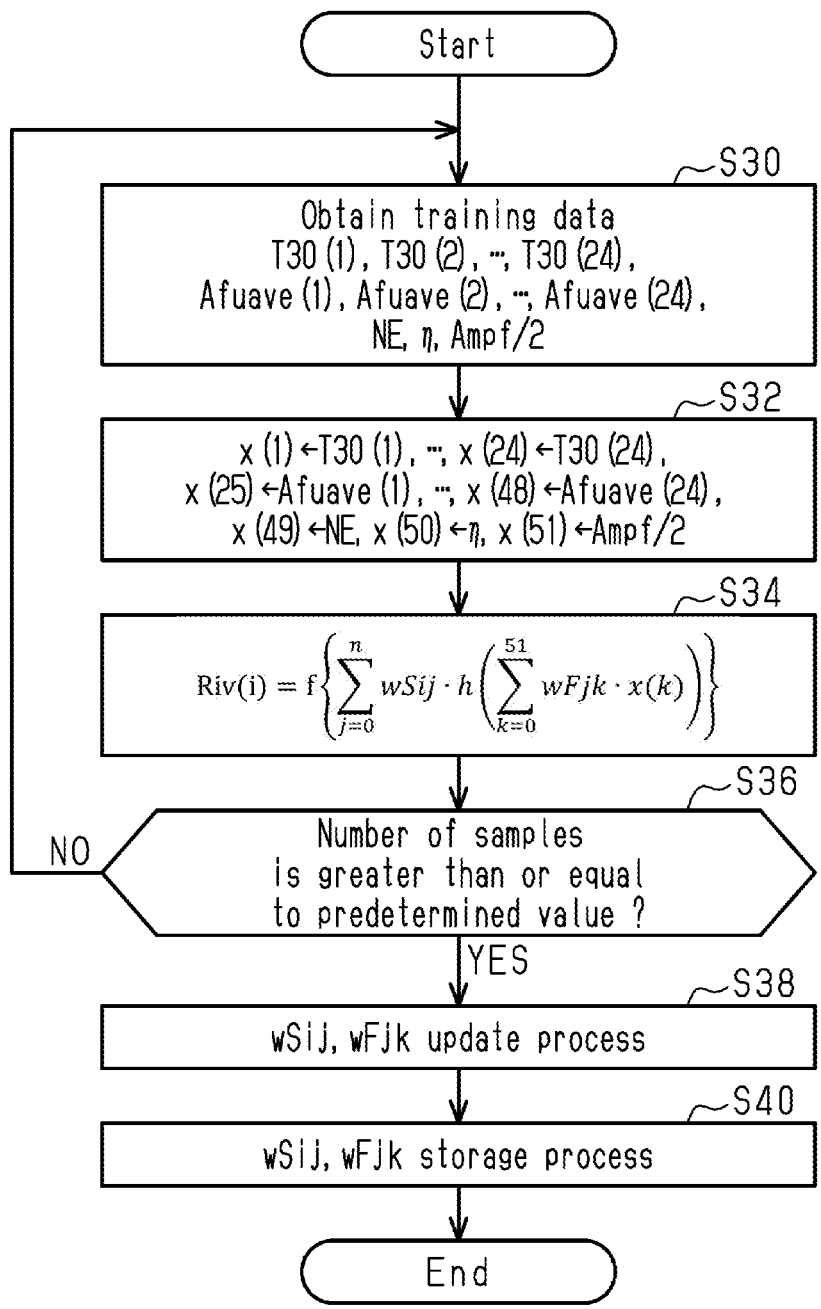
FIG. 6 is a flowchart showing a procedure of a learning process of the mapping data according to the embodiment.

FIG. 6 shows a procedure of a process for generating the mapping data. The process shown in FIG. 6 is executed by the fitting device 104. The process shown in FIG. 6 may be performed by, for example, providing the CPU and the ROM in the fitting device 104, and executing a program stored in the ROM by the CPU.

In the series of processes shown in FIG. 6, the fitting device 104 first obtains, as training data, the same data obtained in the process of S12 based on the detection result of the sensor group 102 (S30). In this process, fuel injection valves 20 in which the imbalance ratio Riv takes various values different from zero and three fuel injection valves in which the imbalance ratio is zero are prepared by the measurement in a single fuel injection valve 20. Then, the process of S30 is performed in a state where three fuel injection valves 20 in which an imbalance ratio is zero and one fuel injection valve 20 in which an imbalance ratio is different from zero are mounted to the internal combustion engine 10. The imbalance ratio Rivt of each mounted fuel injection valve is data of a supervised learning. Here, the sign of the imbalance ratio which is the data of the supervised learning is Rivt obtained by adding t to Riv.

Next, the fitting device 104 substitutes the training data other than the data of the supervised learning to the input variables x(1) to x(51) in the manner of the process of S14 (S32). Then, the fitting device 104 calculates imbalance ratios Riv(1) to Riv(4) using the input variables x(1) to x(51) obtained by the process of S32 in the manner of the process for S16 (S34). Then, the CPU 72 determines whether the number of samples of the imbalance ratio Riv(i) calculated by the process of S34 is greater than or equal to a predetermined value (S36). Here, in order to be greater than or equal to the predetermined value, the operating state of the internal combustion engine 10 is changed in a state where each of the fuel injection valves in which the imbalance ratios Rivt is different from zero are mounted in each of the cylinders #1 to #4. Thus, it is required that the imbalance ratio Riv is calculated at various operating points defined by the rotational speed NE and the charging efficiency η.

When determining that the number of samples of the imbalance ratio Riv(i) is not greater than or equal to the predetermined value (S36: NO), the fitting device 104 returns to the process of S30. In contrast, when determining that the number of samples of the imbalance ratio Riv (i) is greater than or equal to a predetermined number (S36: YES), the CPU 72 updates the input-side coefficient wFjk and the output-side coefficient wSij so as to minimize the sum of the squares of the difference between the imbalance ratio Rivt serving as the data of the supervised learning and each imbalance ratio Riv(i) calculated by the process of S34 (S38). Then, the fitting device 104 stores the updated input-side coefficient wFjk, the output-side coefficient wSij, and the like as learned mapping data (S40).

The operation and advantages of the present embodiment will now be described.

Figure 7:
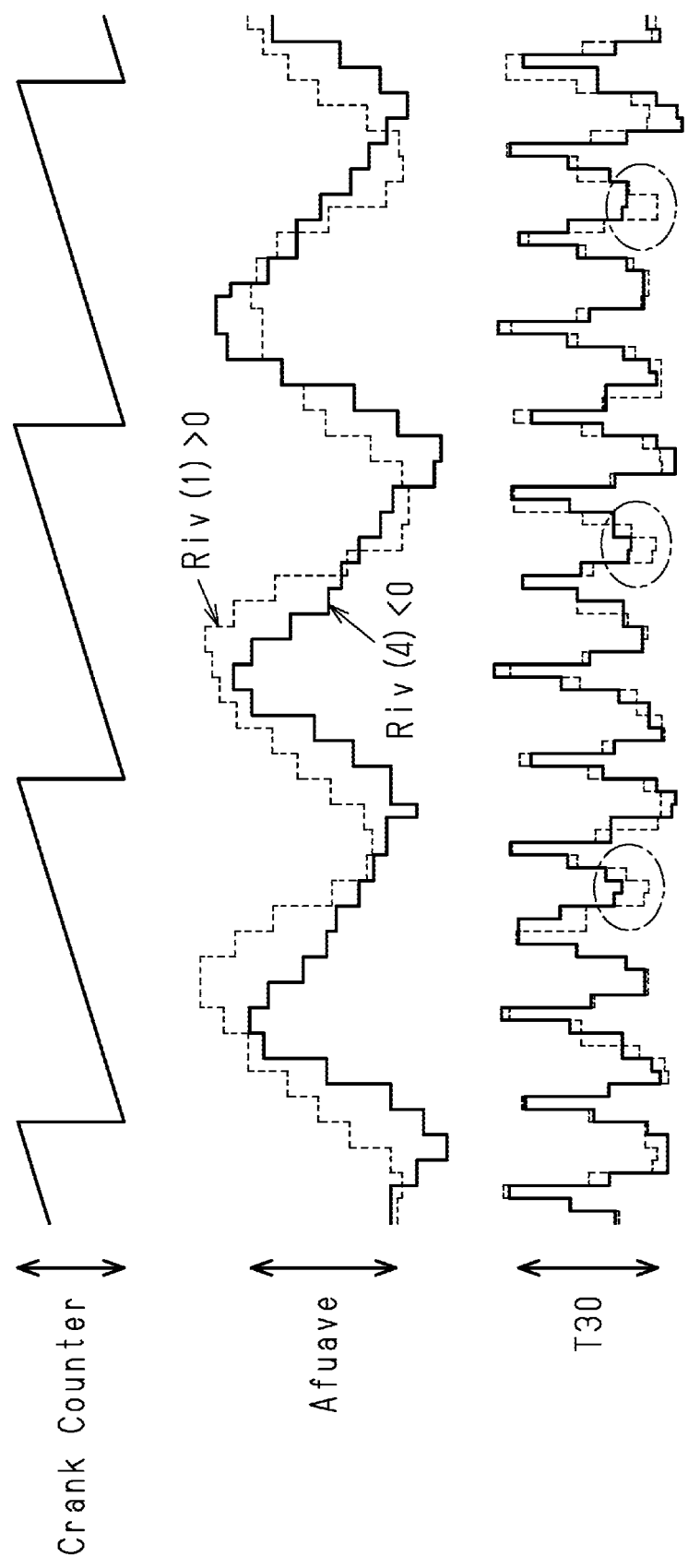
FIG. 7 is a timing chart showing the influence of imbalance on the instantaneous speed variable and the air-fuel ratio.

FIG. 7 shows the variations of the crank counter having a cycle of 360° CA, an upstream-side average value Afuave and a minute rotation duration T30 for each of the case where the imbalance ratio Riv(1) of the cylinder #1 is positive and the case where the imbalance ratio Riv(4) of the cylinder #4 is negative. As shown in FIG. 7, since there is no significant difference in the phase of the upstream-side average value Afuave between when the fuel injection amount is excessive in the cylinder #1 and when the fuel injection amount is deficient in the cylinder #4, it is difficult to identify in which cylinder the abnormality is occurring. However, according to the time series data of the minute rotation duration T30, there is a clear difference between the two types of abnormalities, as can be seen from the area surrounded by the one-dot chain line in FIG. 7.

Therefore, in the present embodiment, the CPU 72 calculates the imbalance ratio Riv using the time series data of the minute rotation duration T30 and the time series data of the upstream-side average value Afuave. Thus, for example, if based only on the upstream detection value Afu, the imbalance ratios Riv(1) to Riv(4) of each cylinder can be calculated in the present embodiment even if it is difficult to distinguish in which cylinder such an abnormality is occurring.

Moreover, in the present embodiment, for example, instead of having the mapping for calculating the imbalance ratio Riv by inputting various variables of the internal combustion engine 10 randomly and in large quantities learned by machine learning, the variable to input to the mapping is carefully selected based on the knowledge of the inventors versed in the control of the internal combustion engine 10. Therefore, compared with the case where the inventor's knowledge is not used, the number of intermediate layers of the neural network and the dimension of the input variable can be reduced, and the structure of mapping for calculating the imbalance ratio Riv(i) can be easily simplified.

The present embodiment described above further has the following advantages.

(1) The rotational speed NE and the charging efficiency η serving as operating point variables that define the operating point of the internal combustion engine 10 are used as inputs to mapping. The operation amount of the operation portion of the internal combustion engine 10 such as the ignition device 22, the EGR valve 34, the intake variable valve timing system 46 and the like tends to be defined based on the operating point of the internal combustion engine 10. Therefore, the operating point variable is a variable including information regarding the operation amount of each operation portion. Therefore, the imbalance ratio Riv(i) can be calculated based on the information regarding the operation amount of each operation portion by having the operating point variable as an input to mapping. Furthermore, the imbalance ratio Riv(i) can be calculated with higher accuracy.

(2) The upstream-side average value Afuave is included in the input to mapping. Thus, for example, compared with the case where the upstream detection value Afu for every time interval of the time series data is used, more accurate information on the oxygen and the unburned fuel flowing into the catalyst 30 can be obtained without increasing the number of data of the time series data. Furthermore, the imbalance ratio Riv(i) can be calculated with higher accuracy.

Figure 8A:
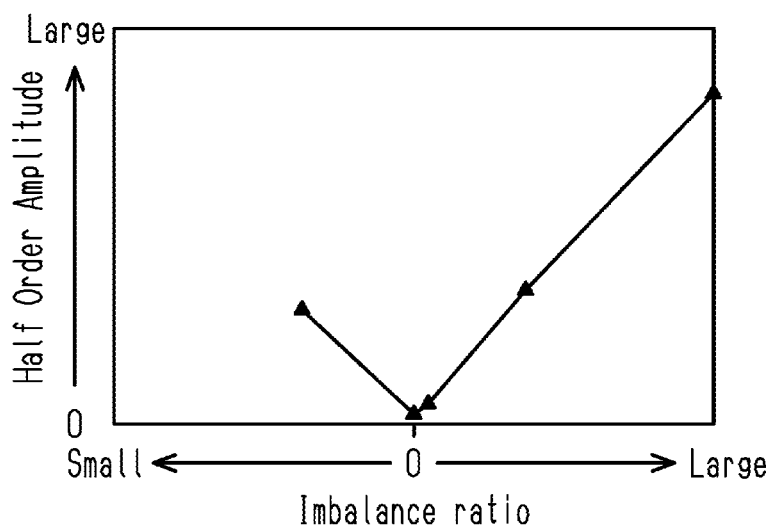
FIG. 8A is a diagram showing the relationship between imbalance and half order amplitude.
Figure 8B:
FIG. 8B is a diagram showing the relationship between the number of rotations and the amplitude.

(3) The imbalance ratio Riv can be calculated with higher accuracy by including the half order amplitude Ampf/2 in the input to the mapping. That is, as shown in FIG. 8A, a linear relationship is established between the imbalance ratio Riv and the half order amplitude Ampf/2. Furthermore, as shown in FIG. 8B a case where the imbalance ratio Riv(1) is 1.15, the amplitude of the rotation frequency of the crankshaft 24 has a particularly large half order component when a cylinder in which the imbalance ratio Riv is not zero exists. This is considered to be because when the imbalance ratio Riv(i) is different from zero in any one of the cylinders #1 to #4, the generated torque shifts once in one combustion cycle. In the present embodiment, the imbalance ratio Riv can be calculated with higher accuracy by taking in the torque fluctuation of the 720° CA cycle as the half order amplitude Ampf/2.

Second Embodiment

Figure 9:
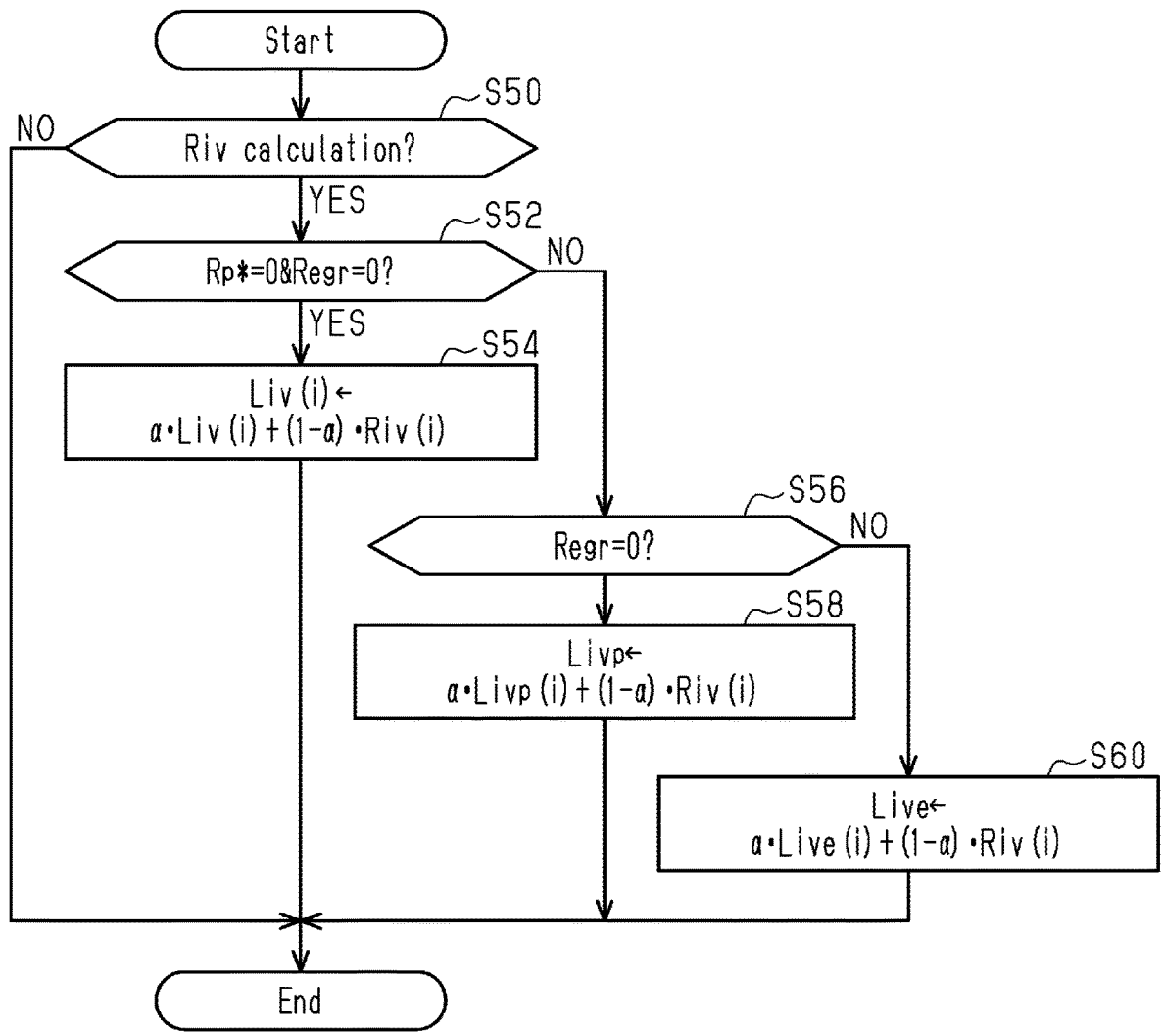
FIG. 9 is a flowchart showing a procedure of a calculation process of an imbalance learned value according to a second embodiment.
Figure 10:
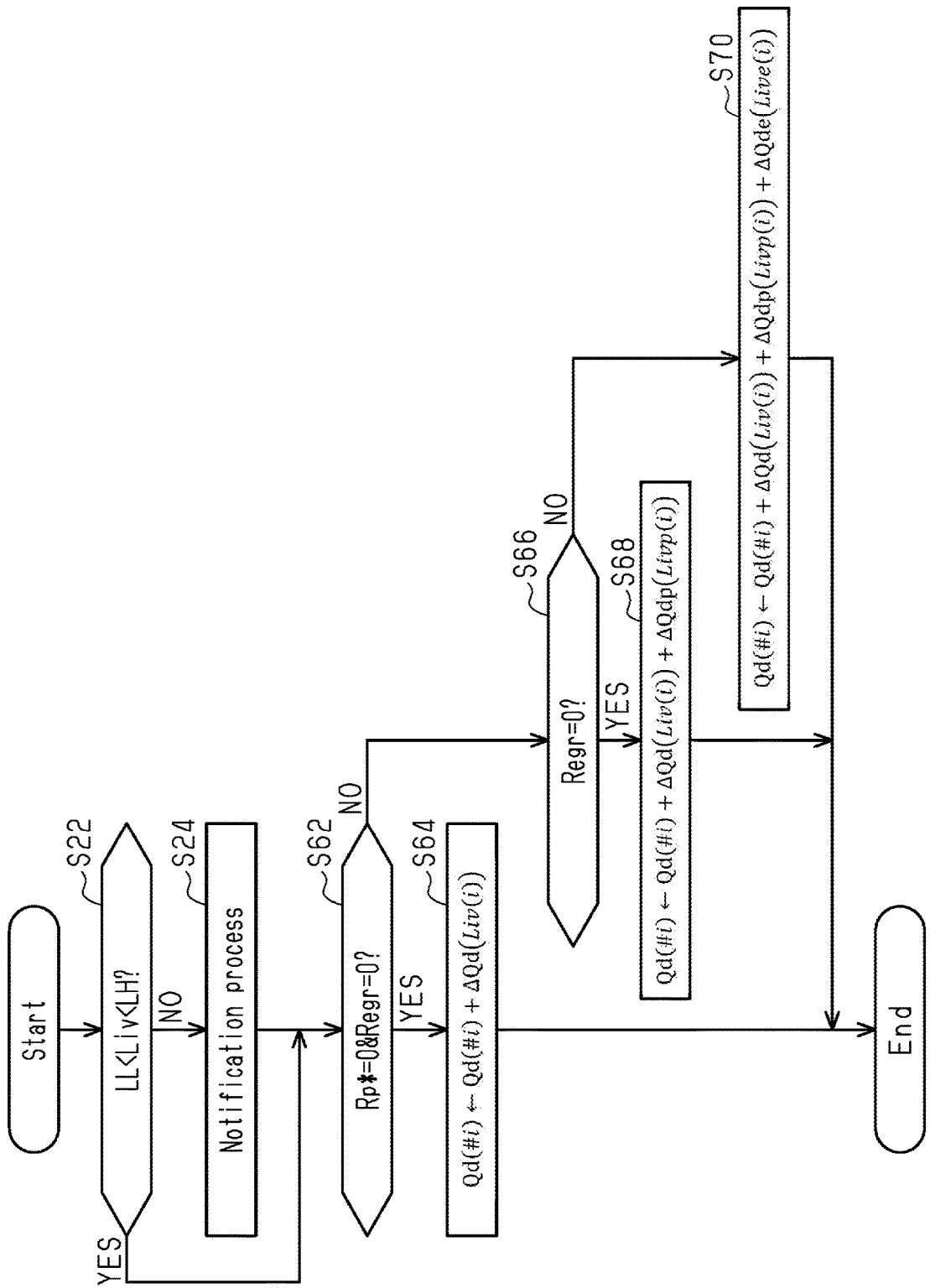
FIG. 10 is a flowchart showing a procedure of a response process for the imbalance according to the second embodiment.

Referring to FIGS. 9 and 10, a second embodiment is now described focusing on the differences from the first embodiment.

In the present embodiment, after the imbalance ratio Riv is calculated once, the target purge ratio Rp* is switched from zero to a value greater than zero, and at that time, the imbalance ratio Riv is calculated again. Thereafter, the EGR ratio Regr is switched from zero to a value greater than zero, and the imbalance ratio Riv is calculated again. Therefore, in the present embodiment, there are three execution conditions in the process of S10 in FIG. 3, when the target purge ratio Rp* is zero and the EGR ratio Regr is zero, where the target purge ratio Rp* is switched from zero to a value greater than zero, and when the EGR ratio Regr is switched from zero to a value greater than zero.

FIG. 9 shows a procedure of a calculation process of a learned value based on the imbalance ratio Riv thus calculated. The process shown in FIG. 9 is performed by the CPU 72 repeatedly executing the response program 74b stored in the ROM 74 at, for example, a predetermined cycle.

In the series of processes shown in FIG. 9, the CPU 72 first determines whether the imbalance ratio Riv has been newly calculated (S50). When determining that the imbalance ratio Riv has been newly calculated (S50: YES), the CPU 72 determines whether the input variable used to calculate the imbalance ratio Riv is that which has been sampled when the target purge ratio Rp* is zero and the EGR ratio Regr is zero (S52). When making an affirmative determination in the process of S52, the CPU 72 executes the same process as S20 (S54).

When making a negative determination in the process of S52, the CPU 72 determines whether the input variable used to calculate the imbalance ratio Riv is that which has been sampled when the EGR ratio Regr is zero. (S56). When determining that it has been sampled when the EGR ratio Regr is zero (S56: YES), the CPU 72 updates a purge learned value Livp(i) by the exponential moving average process using the imbalance ratio Riv(i) calculated this time as an input (S58).

When determining that the input variable used to calculate the imbalance ratio Riv is that which has been sampled when the EGR ratio Regr is greater than zero (S56: NO), the CPU 72 updates a EGR learned value Live(i) by the exponential moving average process using the imbalance ratio Riv(i) calculated this time as an input (S60).

When the processes of S54, S58, and S60 are completed or when a negative determination is made in the process of S50, the CPU 72 once ends the series of processes shown in FIG. 9.

FIG. 10 shows a procedure of a process using the learned value. The process shown in FIG. 10 is performed by the CPU 72 repeatedly executing the response program 74b stored in the ROM 74 shown in FIG. 1 at, for example, a predetermined cycle. In FIG. 10, processes corresponding to the processes shown in FIG. 4 are given the same step numbers for the sake of convenience.

In the series of processes shown in FIG. 10, when making a positive determination in S22 or completing the process of S24, the CPU 72 determines whether the target purge ratio Rp* is zero and the EGR ratio Regr is zero (S62). When determining that the target purge ratio Rp* is zero and the EGR ratio Regr is zero (S62: YES), the CPU 72 executes the same process as the process of S26 (S64).

When making a negative determination in the process of S62, the CPU 72 determines whether the EGR ratio Regr is zero (S66). When determining that the EGR ratio Regr is zero (S66: YES), the CPU 72 corrects the required injection amount Qd(#i) of each cylinder based not only on the imbalance learned value Liv(i) but also on the purge learned value Livp(i) (S68). That is, the CPU 72 corrects the required injection amount Qd(#i) to the required injection amount Qd (#i) of each cylinder by adding the correction amount ΔQd(Liv(i)) corresponding to the imbalance learned value Liv(i) and the correction amount ΔQdp(Livp(i)) corresponding to the purge learned value Livp(i).

When determining that the EGR ratio Regr is greater than zero (S66: NO), the CPU 72 corrects the required injection amount Qd(#i) of each cylinder based on the imbalance learned value Liv(i), the purge learned value Livp(i), and the EGR learned value Live(i) (S70). That is, the CPU 72 corrects the required injection amount Qd(#i) of each cylinder by the sum of the correction amount ΔQd(Liv (i)) corresponding to the imbalance learned value Liv(i), the correction amount ΔQdp(Livp(i)) corresponding to the purge learned value Livp(i), and the correction amount ΔQde(Live(i)) corresponding to the EGR learned value Live(i).

When the processes of S64, S68, S70 are completed, the CPU 72 once terminates the series of processes shown in FIG. 10. In the present embodiment, when the process of S12 for calculating the imbalance ratio Riv to be used in the process of S58 is executed, the correction amount ΔQd(Livp (i)) corresponding to the purge learned value Livp(i) is not used in the process of S68. Furthermore, when the process of S12 for calculating the imbalance ratio Riv to be used in the process of S60 is executed, the correction amount ΔQd(Live(i)) corresponding to the EGR learned value Live (i) is not used in the process of S70.

In the present embodiment, the mapping data 76a is desirably that in which data in each of the cases where an affirmative determination is made in the process of S62, an affirmative determination is made in the process of S66, and a negative determination is made in the process of S66 are learned as the training data. However, instead of having the mapping data 76a as a single piece of data, the data may be different for when an affirmative determination is made in the process of S62, when an affirmative determination is made in the process of S66, and when a negative determination is made in the process of S66. In this case, each data is learned using only the corresponding training data.

In addition to the advantages of the first embodiment, the second embodiment has the following advantage.

(4) The imbalance ratio Riv when the target purge ratio Rp* is made to be greater than zero is calculated, and the required injection amount Qd is corrected based on the purge learned value Livp(i) corresponding thereto. Thus, even when the purge ratio is greater than zero, variations in the air-fuel ratio of the cylinders #1 to #4 can be suppressed. That is, when the purge ratio is greater than zero, fuel vapor flows from the canister 40 into the intake passage 12 and flows into each of the cylinders #1 to #4, but the inflow amount varies for each of the cylinders #1 to #4. This variation cannot be expressed by the imbalance learned value Liv(i) obtained by quantifying the variation caused by individual differences or aging degradation of the fuel injection valve 20. In contrast, in the present embodiment, the variation in the air-fuel ratio of the cylinders #1 to #4 can be suppressed by correcting the required injection amount Qd based on the purge learned value Livp(i).

(5) The imbalance ratio Riv when the EGR ratio Regr is greater than zero is calculated, and the required injection amount Qd is corrected based on the EGR learned value Live(i) corresponding thereto. Thus, even when the EGR ratio Regr is greater than zero, variations in the air-fuel ratio of the cylinders #1 to #4 can be suppressed. That is, when the EGR ratio Regr is greater than zero, the exhaust air from the exhaust passage 28 flows into the intake passage 12 through the EGR passage 32, which then flows into each of the cylinders #1 to #4, but the inflow amount varies for each cylinder #1 to #4. This variation cannot be expressed by the imbalance learned value Liv(i) obtained by quantifying the variation caused by individual differences or aging degradation of the fuel injection valve 20. In the present embodiment, the variation in the air-fuel ratio of the cylinders #1 to #4 can be suppressed by correcting the required injection amount Qd based on the EGR learned value Live(i).

Third Embodiment

Figure 11:
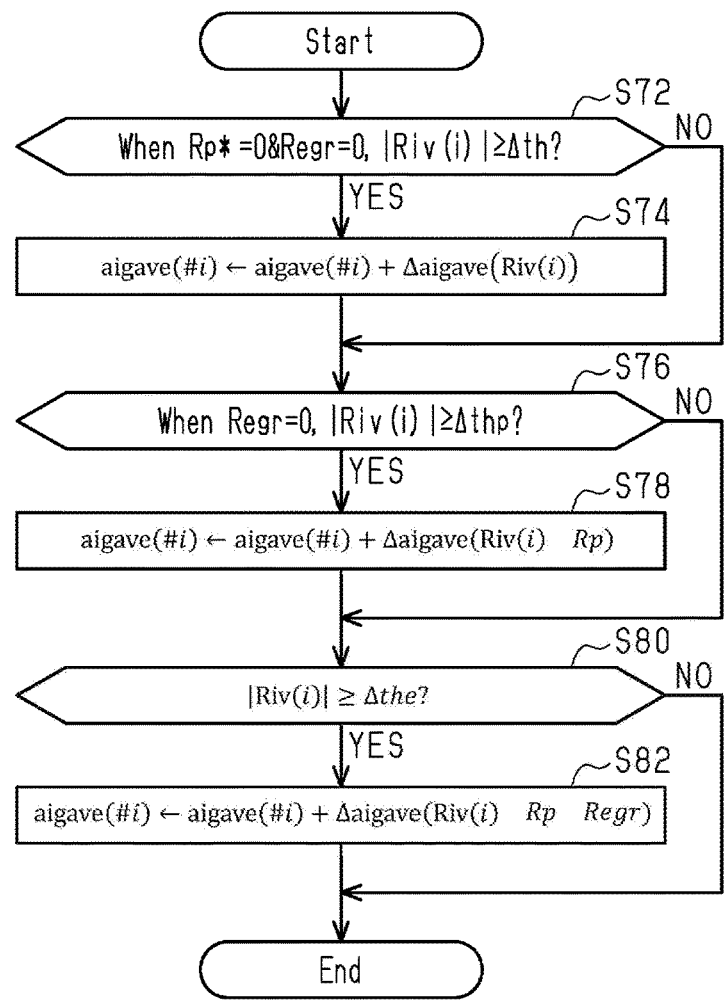
FIG. 11 is a flowchart showing a procedure of a response process for an imbalance according to a third embodiment.

Referring to FIG. 11, a third embodiment is now described focusing on the differences from the second embodiment.

In the present embodiment, when the imbalance is not sufficiently eliminated by the injection amount correction, the ignition timing is operated.

FIG. 11 shows a procedure of a process related to the operation of the ignition timing corresponding to the imbalance ratio Riv. The process shown in FIG. 11 is performed by the CPU 72 repeatedly executing the response program 74b stored in the ROM 74 shown in FIG. 1 on the condition that the number of updates of, for example, the imbalance learned value Liv(i) and the like is greater than or equal to a predetermined number.

In the series of processes shown in FIG. 11, first, the CPU 72 determines whether the absolute value of the imbalance ratio Riv(i) newly calculated when the process of S64 of FIG. 10 is executed is greater than or equal to a predetermined value Δth when the target purge ratio Rp* is zero and the EGR ratio Regr is zero (S72). This process is a process of determining whether the imbalance is not sufficiently eliminated depending on the correction amount ΔQd(Liv(i)) based on the imbalance learned value Liv(i). When determining that the absolute value of the imbalance ratio Riv(i) is greater than or equal to the predetermined value Δth (S72: YES), the CPU 72 corrects the ignition timing aig(#i) of each cylinder #i based on a newly calculated imbalance ratio Riv(i) (S74). Here, for example, the CPU 72 executes a process for advancing the ignition timing aig with respect to a cylinder in which the absolute value of the imbalance ratio Riv(i) is greater than zero. This is because if the imbalance ratio Riv is deviated from zero as the air-fuel ratio is excessively rich and misfiring, there is a possibility the combustion may improve by advancing the ignition timing aig.

When the process of S74 is completed, or when a negative determination is made in the process of S72, the CPU 72 determines whether the absolute value of the imbalance ratio Riv(i) newly calculated when the process of S68 of FIG. 10 is executed is greater than or equal to a predetermined value Δthp when the EGR ratio Regr is zero (S76). This process is a process for determining whether the imbalance is not sufficiently eliminated depending on the correction amount ΔQd(Livp(i)) based on the purge learned value Livp(i). When determining that the absolute value of the imbalance ratio Riv(i) is greater than or equal to the predetermined value Δthp (S76: YES), the CPU 72 corrects the ignition timing aig(#i) of each cylinder #i based on a newly calculated imbalance ratio Riv(i) and the target purge ratio Rp* (S78).

When the process of S78 is completed, or when a negative determination is made in the process of S76, the CPU 72 determines whether the absolute value of the imbalance ratio Riv(i) newly calculated when the process of S70 of FIG. 10 is executed is greater than or equal to a predetermined value Δthe when the EGR ratio Regr is greater than zero (S80). This process is a process for determining whether the imbalance is not sufficiently eliminated depending on the correction amount ΔQd(Live (i)) based on the EGR learned value Live(i). When determining that the absolute value of the imbalance ratio Riv(i) is greater than or equal to the predetermined value Δthe (S80: YES), the CPU 72 corrects the ignition timing aig(#i) of each cylinder #i based on a newly calculated imbalance ratio Riv(i), the target purge ratio Rp*, and the EGR ratio Regr (S82).

When the process of S82 is completed or when a negative determination is made in the process of S80, the CPU 72 once terminates the series of processes shown in FIG. 11.

Fourth Embodiment

Figure 12:
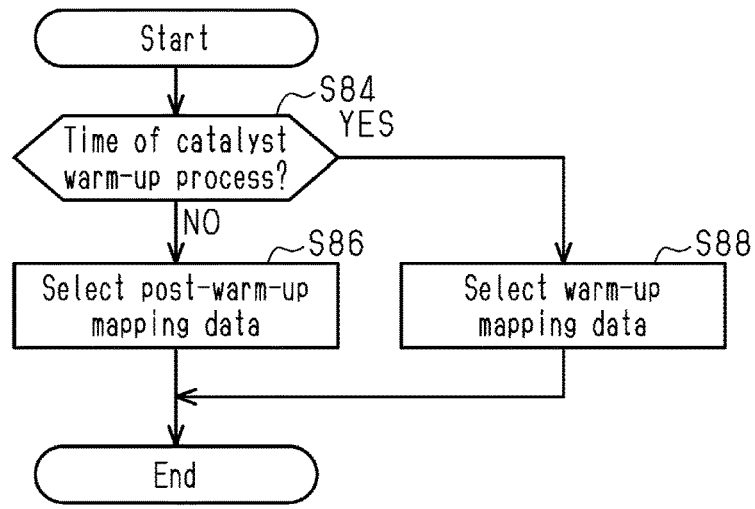
FIG. 12 is a flowchart showing a procedure of a selecting process of the mapping data according to a fourth embodiment.

Referring to FIG. 12, a fourth embodiment is now described focusing on the differences from the first embodiment.

In the present embodiment, a plurality of types of mapping data are stored in the storage device 76 as the mapping data 76a. The plurality of types of mapping data are mapping data for each control mode.

FIG. 12 shows a procedure of a process performed prior to the process of FIG. 3. The process shown in FIG. 12 is performed by the CPU 72 repeatedly executing the imbalance detection program 74a stored in the ROM 74 at, for example, a predetermined cycle.

In the series of processes shown in FIG. 12, the CPU 72 determines whether it is a warm-up process of the catalyst 30 (S84). The warm-up process includes a process for retarding the ignition timing aig by a predetermined amount. The warm-up process is executed by the CPU 72 when, for example, the logical conjunction is true for the integrated value of the intake air amount Ga from the start of the internal combustion engine 10 being less than or equal to a predetermined value and the water temperature THW being less than or equal to a predetermined temperature.

When determining that it is not the time of the catalyst warm-up process (S84: NO), the CPU 72 selects post-warm-up mapping data from the mapping data 76a stored in the storage device 76 (S86). The CPU 72 thus calculates the imbalance ratio Riv(i) using the post-warm-up mapping data in the process of S16. Here, the post-warm-up mapping data is data generated through the process shown in FIG. 6 using the training data, the training data being generated based on the detection value obtained by the sensor group 102 shown in FIG. 5, after the warm-up of the internal combustion engine 10.

When determining that it is the time of the catalyst warm-up process (S84: YES), the CPU 72 selects the warm-up mapping data from the mapping data 76a stored in the storage device 76 (S88). The warm-up mapping data is data generated based on the training data corresponding to the detection value obtained by the sensor group 102 when the warm-up process of the internal combustion engine 10 is being executed.

When the processes of S86, S88 are completed, the CPU 72 once terminates the series of processes shown in FIG. 12.

The operation and advantages of the fourth embodiment will now be described.

The CPU 72 calculates the imbalance ratio Riv using the warm-up mapping data when the warm-up process of the catalyst 30 is executed, and calculates the imbalance ratio Riv using the post-warm-up mapping data when the warm-up process is not executed. At the time of the warm-up process of the catalyst 30, the ignition timing aig is on the retarded side, and thus the rotational behavior of the crankshaft 24 is different from when the warm-up process is not performed. Nevertheless, for example, when attempting to generate a single mapping for calculating the imbalance ratio Riv with high accuracy, data that can be distinguished between when the catalyst 30 is warmed and when it is not is desirably added to the input variable x, in which case, the number of input-side coefficients wFjk and the like increases, and hence a large amount of training data become necessary. In particular, whether the execution condition of the warm-up process is satisfied is not determined only by two sampling values of the intake air amount Ga and the water temperature THW, and thus the dimension of the input variable tends to be excessive in distinguishing between when the catalyst 30 is warmed and when it is not warmed. When expanding the dimension of the input variable, and the like, for example, a request for complicating the mapping structure such as increasing the intermediate layer of the neural network is likely to occur. However, when complicating the mapping structure such as increasing the number of intermediate layers, the computation load on the CPU 72 increases. In contrast, in the present embodiment, the number of dimensions of the input variable x can be suppressed from becoming excessive and the mapping structure can be easily simplified while ensuring the calculation accuracy of the imbalance ratio Riv by dividing the mapping data between when the catalyst is warmed and after the catalyst is warmed.

Fifth Embodiment

Figure 13:
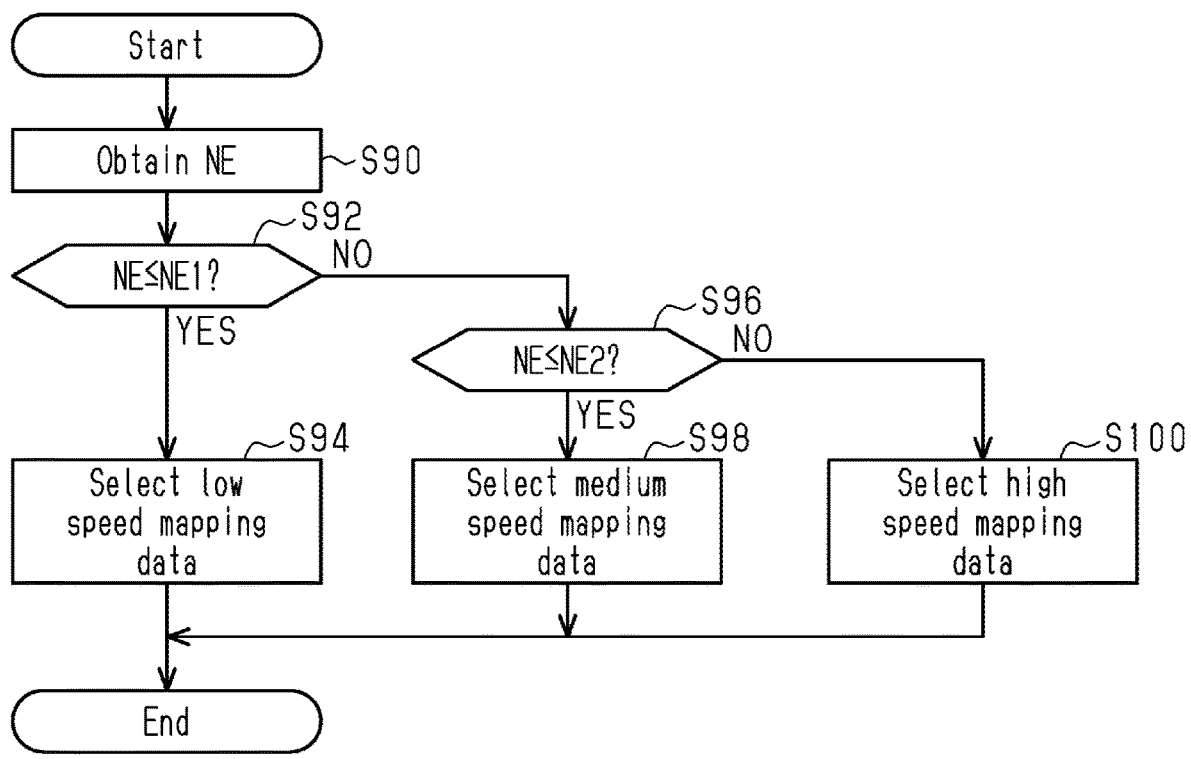
FIG. 13 is a flowchart showing a procedure of a selecting process of the mapping data according to a fifth embodiment.

Referring to FIG. 13, a fifth embodiment is now described focusing on the differences from the first embodiment.

In the present embodiment, a plurality of types of mapping data are stored in the storage device 76 as the mapping data 76a. These mapping data are mapping data for each rotational speed NE.

FIG. 13 shows a procedure of a process performed prior to the process shown in FIG. 3. The process shown in FIG. 13 is performed by the CPU 72 repeatedly executing the imbalance detection program 74a stored in the ROM 74 at, for example, a predetermined cycle.

In the series of processes shown in FIG. 13, the CPU 72 first obtains the rotational speed NE (S90). Next, the CPU 72 determines whether the rotational speed NE is lower than or equal to a low speed threshold NE1 (S92). When determining that the rotational speed NE is lower than or equal to the low speed threshold NE1 (S92: YES), the CPU 72 selects low speed mapping data from the mapping data 76a stored in the storage device 76 (S94). The CPU 72 thereby calculates the imbalance ratio Riv using the low speed mapping data in the process of S16. Here, the low speed mapping data is data generated through the process shown in FIG. 6 by generating the training data based on the detection value obtained by the sensor group 102 when a state in which the rotational speed NE is lower than or equal to the low speed threshold NE1 is achieved by controlling the dynamometer 100 and the like in the system shown in FIG. 5.

When determining that the rotational speed NE is greater than the low speed threshold NE1 (S92: NO), the CPU 72 determines whether the rotational speed NE is lower than or equal to the medium speed threshold NE2 (S96). The medium speed threshold NE2 is set to a value larger than the low speed threshold NE1. When determining that the rotational speed NE is lower than or equal to the medium speed threshold NE2 (S96: YES), the CPU 72 selects the medium speed mapping data from the mapping data 76a stored in the storage device 76 (S98). The medium speed mapping data is data generated based on the training data corresponding to the detection value obtained by the sensor group 102 when the rotational speed NE of the internal combustion engine 10 is greater than the low speed threshold NE1 and is lower than or equal to the medium speed threshold NE2.

When determining that the rotational speed NE is greater than the medium speed threshold NE2 (S96: NO), the CPU 72 selects the high speed mapping data from the mapping data 76a stored in the storage device 76 (S100). The high speed mapping data is data generated based on the training data corresponding to the detection value obtained by the sensor group 102 when the rotational speed NE of the internal combustion engine 10 is greater than the medium speed threshold NE2.

When the processes of S94, S98, S100 are completed, the CPU 72 once terminates the series of processes shown in FIG. 13.

Thus, in the present embodiment, appropriate mapping data can be used at each rotational speed NE by properly using the mapping data according to the rotational speed NE. Therefore, for example, compared with a case where common mapping data is used regardless of the magnitude of the rotational speed NE, in the present embodiment, the mapping structure can be easily simplified while ensuring the calculation accuracy of the imbalance ratio Riv.

Sixth Embodiment

Figure 14:
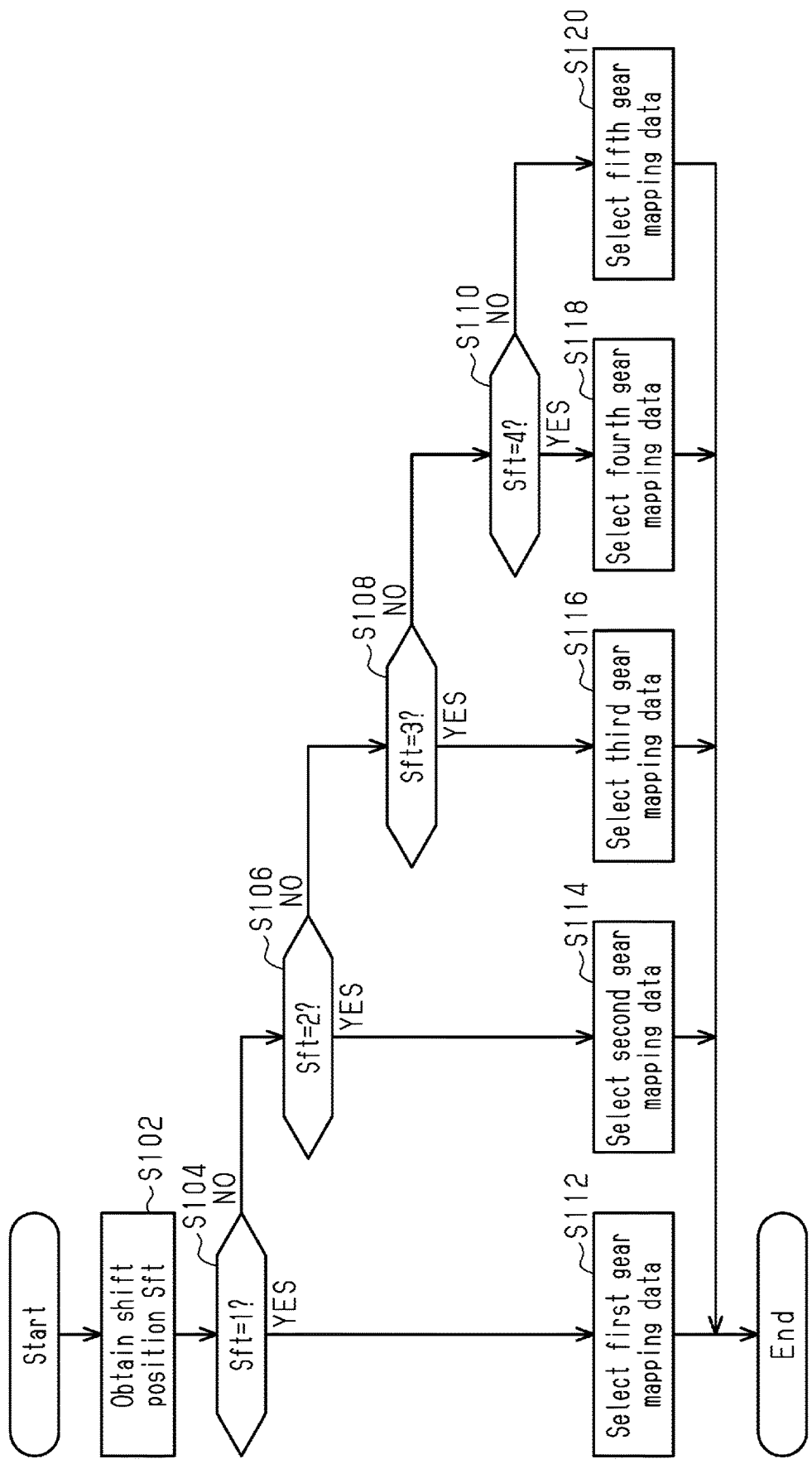
FIG. 14 is a flowchart showing a procedure of a selecting process of the mapping data according to a sixth embodiment.

Referring to FIG. 14, a sixth embodiment is now described focusing on the differences from the first embodiment.

In the present embodiment, a plurality of types of mapping data are stored in the storage device 76 as the mapping data 76a. These types of mapping data are mapping data for each shift position Sft.

FIG. 14 shows a procedure of a selecting process of the mapping data according to the present embodiment. The process shown in FIG. 14 is performed by the CPU 72 repeatedly executing the imbalance detection program 74a stored in the ROM 74 at, for example, a predetermined cycle.

In the series of processes shown in FIG. 14, the CPU 72 first obtains the shift position Sft (S102). Next, the CPU 72 determines the shift position Sft by the determination processes of whether the shift position Sft is the first gear (S104), whether it is the second gear (S106), whether it is the third gear (S108), and whether it is the fourth gear (S110). When determining that it is the first gear (S104: YES), the CPU 72 selects the first gear mapping data from the mapping data 76a stored in the storage device 76 (S112). Accordingly, the CPU 72 calculates the imbalance ratio Riv using the first gear mapping data in the process of S16. Similarly, when determining that it is the second gear (S106: YES), the CPU 72 selects the second gear mapping data (S114), and when determining that it is the third gear (S108: YES), the CPU 72 selects the third gear mapping data (S116), and when determining that it is the fourth gear (S110: YES), the CPU 72 selects the fourth gear mapping data (S118). When determining that it is the fifth gear (S110: NO), the CPU 72 selects the fifth gear mapping data (S120).

Here, assuming the variable m is 1 to 5, the mth gear mapping data is data generated through the process shown in FIG. 6 using the training data, the training data being generated based on the detection value obtained by the sensor group 102 shown in FIG. 5 when the transmission 64 is set to m speed.

When the processes of S112 to S120 are completed, the CPU 72 once terminates the series of processes shown in FIG. 14.

According to the present embodiment described above, by using the mapping data corresponding to the shift position Sft, the inertia constant from the crankshaft 24 to the drive wheels 69 changes according to the shift position Sft, and consequently, the imbalance ratio Riv can be calculated by appropriately reflecting change in the rotational behavior of the crankshaft 24. Thus, compared with a case where all shift positions Sft are handled by a single mapping, the structure of each mapping can be easily simplified while ensuring the calculation accuracy of the imbalance ratio Riv.

Seventh Embodiment

Figure 15:
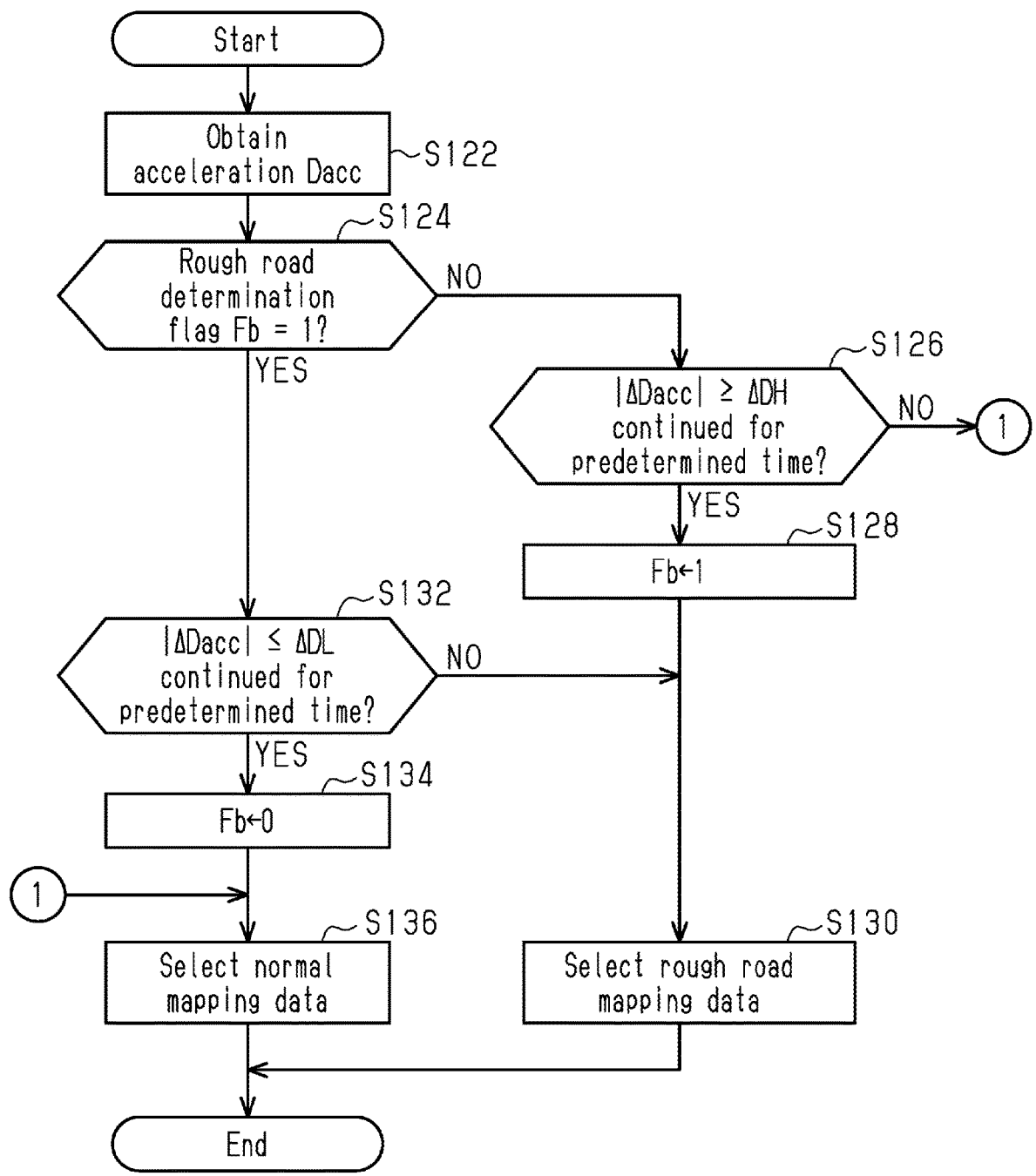
FIG. 15 is a flowchart showing a procedure of a selection process of the mapping data according to a seventh embodiment.

Referring to FIG. 15, a seventh embodiment is now described focusing on the differences from the first embodiment.

In the present embodiment, a plurality of types of mapping data are stored in the storage device 76 as the mapping data 76a. These types of mapping data are mapping data for each road surface state.

FIG. 15 shows a procedure of a process performed prior to the process of FIG. 3. The process shown in FIG. 15 is performed by the CPU 72 repeatedly executing the imbalance detection program 74a stored in the ROM 74 at, for example, a predetermined cycle.

In the series of processes shown in FIG. 15, the CPU 72 first obtains the acceleration Dacc (S122). Next, the CPU 72 determines whether a rough road determination flag Fb is 1 (S124). The rough road determination flag Fb is 1 when the road surface on which the vehicle VC is traveling has many undulations and 0 otherwise. When determining that the rough road determination flag Fb is 0 (S124: YES), the CPU 72 determines whether a state in which the absolute value of the change amount in the acceleration Dacc is greater than or equal to a predetermined value $\Delta DH$ has continued for a predetermined time (S126). Here, the change amount in the acceleration Dacc may be the difference between the previous value and the current value of the acceleration Dacc. This process is a process for determining whether the road surface has many undulations. When determining that the state in which the absolute value of the change amount in the acceleration Dacc is greater than or equal to the predetermined value $\Delta DH$ has continued for a predetermined time (S126: YES), the CPU 72 substitutes 1 to the rough road determination flag Fb (S128), and selects the rough road mapping data from the mapping data 76a stored in the storage device 76 (S130). Thus, the CPU 72 calculates the imbalance ratio Riv using the rough road mapping data in the process of S16. The training data for generating rough road mapping data may be generated based on the detection value obtained by the sensor group 102 shown in FIG. 5 while simulating the load torque applied to the crankshaft 24 when vibration is applied to the vehicle by the dynamometer 100 shown, for example, in FIG. 5. For example, the internal combustion engine 10 and the dynamometer 100 shown in FIG. 5 are mounted on a device capable of generating vibration. Then, when vibration is applied to the vehicle by generating vibration, training data is generated based on the detection value obtained by the sensor group 102 shown in FIG. 5 while simulating the load torque applied to the crankshaft 24.

On the other hand, when determining that the rough road determination flag Fb is 1 (S124: YES), the CPU 72 determines whether a state in which the absolute value of the change amount in the acceleration Dacc is less than or equal to a specified value $\Delta DL$ ($<\Delta DH$) has continued for a predetermined time (S132). When making a negative determination in the process of S132, the CPU 72 proceeds to the process of S130.

When determining that the state in which the absolute value of the change amount in the acceleration Dacc is less than or equal to the specified value $\Delta DL$ ($<\Delta DH$) has continued for a predetermined time (S132: YES), the CPU 72 substitutes 0 to the rough road determination flag Fb (S134). Then, when the process of S134 is completed or when a negative determination is made in the process of S126, the CPU 72 selects normal mapping data from the mapping data 76a (S136). The normal mapping data is data generated through the process shown in FIG. 6 using the training data, the training data being generated, for example, based on the detection value obtained by the sensor group 102 shown in FIG. 5 in a state where no intentional vibration is applied to the internal combustion engine 10 or the dynamometer 100 shown in FIG. 5.

When the processes of S130, S136 are completed, the CPU 72 once terminates the series of processes shown in FIG. 15.

According to the present embodiment described above, the imbalance ratio Riv can be calculated by appropriately reflecting change in the rotational behavior of the crankshaft 24 according to the road surface state by using the mapping data corresponding to the road surface state. Furthermore, compared with a case where various road surface states are handled by a single mapping, the mapping structure can be easily simplified while ensuring the calculation accuracy of the imbalance ratio Riv.

Eight Embodiment

Figure 16:
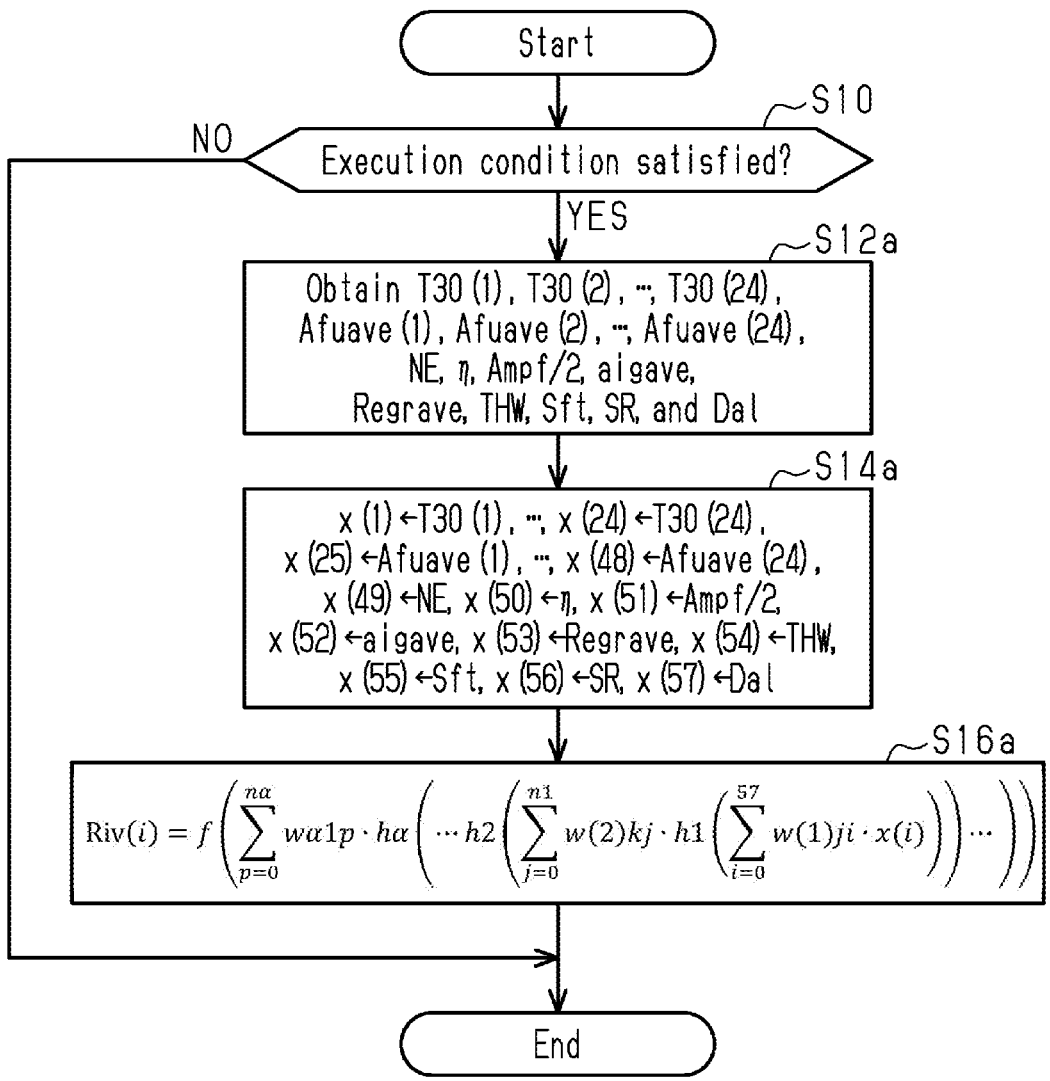
FIG. 16 is a flowchart showing a procedure of an imbalance detection process according to an eighth embodiment.

Referring to FIG. 16, an eighth embodiment is now described focusing on the differences from the first embodiment.

In the present embodiment, the dimension of the input variable x is expanded.

FIG. 16 shows a procedure of the imbalance detection process according to the present embodiment. The process shown in FIG. 16 is performed by the CPU 72 repeatedly executing the imbalance detection program 74a stored in the ROM 74 at, for example, a predetermined cycle. In FIG. 16, processes corresponding to the processes shown in FIG. 2 are given the same step numbers for the sake of convenience, and the description thereof is omitted.

In the series of processes shown in FIG. 16, when making an affirmative determination in the process of S10, the CPU 72 obtains, in addition to the variables obtained in the process of S12, the ignition timing average value aigave, EGR ratio average value Regrave, water temperature THW, shift position Sft, road surface state variable SR, and alcohol concentration Da1 (S12a). Here, the ignition timing average value aigave and the EGR ratio average value Regrave are average values of the ignition timing aig and the EGR ratio Regr in the cycle of the process of FIG. 16. Furthermore, the road surface state variable SR is a parameter calculated by the CPU 72 based on the acceleration Dacc, and for example, may be a variable that can take different binary values depending on whether the road surface has many undulations or few undulations. The generation process of the road surface state variable SR may be, for example, the same process as the setting process of the value of the rough road determination flag Fb in the process of FIG. 15. Furthermore, the alcohol concentration Da1 may be estimated from, for example, the correction ratio δ of the feedback process M20 described above.

Next, the CPU 72 inputs the data obtained in S12a to the input variables x(1) to x(57) of the mapping (S14a). Here, the ignition timing average value aigave and the EGR ratio average value Regrave are parameters (moderator variables) for adjusting the combustion speed of the air-fuel mixture in the combustion chamber 18 by the operation of the operation portion of the internal combustion engine 10. That is, the ignition timing aig is an operation amount of the ignition device 22 serving as an operation portion, and is an moderator variable for adjusting the combustion speed by the operation of the ignition device 22. The EGR ratio Regr is an moderator variable for adjusting the combustion speed by operating the EGR valve 34 serving as an operation portion. The reason for adding these moderator variables to the input variable x is that the behavior of the crankshaft 24 changes depending on the combustion speed of the air-fuel mixture.

On the other hand, the water temperature THW is a state variable of the internal combustion engine 10, and in particular, is a parameter that changes the friction of the sliding portion such as the friction between the piston and the cylinder. In view of the fact that the rotational behavior of the crankshaft 24 also changes by the water temperature THW, in the present embodiment, the water temperature THW is added to the input variable x.

Furthermore, since the theoretical air-fuel ratio differs depending on the alcohol concentration Da1, it can be a factor that changes the degree of variations in the fuel injection amount. In view of such, in the present embodiment, the alcohol concentration Da1 is added to the input variable.

When completing the process of S14a, the CPU 72 inputs the input variables x(1) to x(57) to the mapping defined by the mapping data 76a to calculate the imbalance ratio Riv(i) of the cylinders #1 to #4 (S16a). This mapping is configured by a neural network, and the number of intermediate layers of the neural network is α, and the activation functions h1 to hα of each intermediate layer and the activation function f of the output layer are hyperbolic tangents. For example, the value of each node of the first intermediate layer is generated by inputting the output when the input variables x(1) to x(57) are input to the linear variable defined by the coefficient w(1)ji (j=0 to n1, i=0 to 57) to the activation function h1. That is, if m=1, 2, . . . , α, the value of each node of the mth intermediate layer is generated by inputting the output of the linear mapping defined by the coefficient w(m) to the activation function hm. Here, n1, n2, . . . , nα are the number of nodes of the first, second, . . . αth intermediate layer. Incidentally, w(1)j0 and the like are bias parameters, and the input variable x(0) is defined as 1.

When completing the process of S16a, the CPU 72 once ends the process of FIG. 16.

In the present embodiment, the training data obtained in the process of S30 in FIG. 6 includes all the parameters obtained in S12a, the process equivalent to S14a is executed as the process of S32, and the mapping in which the input variable x is 57-dimension is used in the process of S34. However, the input variable x(0) is not included in the number of dimensions. Furthermore, the training data corresponding to a case in which the road surface state variable SR indicates that the road surface has many undulations is the same as that used for generation of the rough road mapping data shown in FIG. 15.

Thus, in the present embodiment, the moderator variable for adjusting the combustion speed, the state variable of the internal combustion engine 10, the driveline system state variable, the road surface state variable SR, and the alcohol concentration Da1 are added to the input variable x. Although these are parameters that affect the rotational behavior of the crankshaft 24, they are difficult to take into account by the conventional method of detecting imbalance based on the difference between the time required for rotation of adjacent angular intervals. That is, when these parameters are taken into account, the fitting time becomes enormous, and the feasibility is poor. On the other hand, in the present embodiment, a logic for calculating the imbalance ratio Riv(i) by taking these into consideration can be constructed within the range of practical fitting time by using machine learning.

Ninth Embodiment

Figure 17:
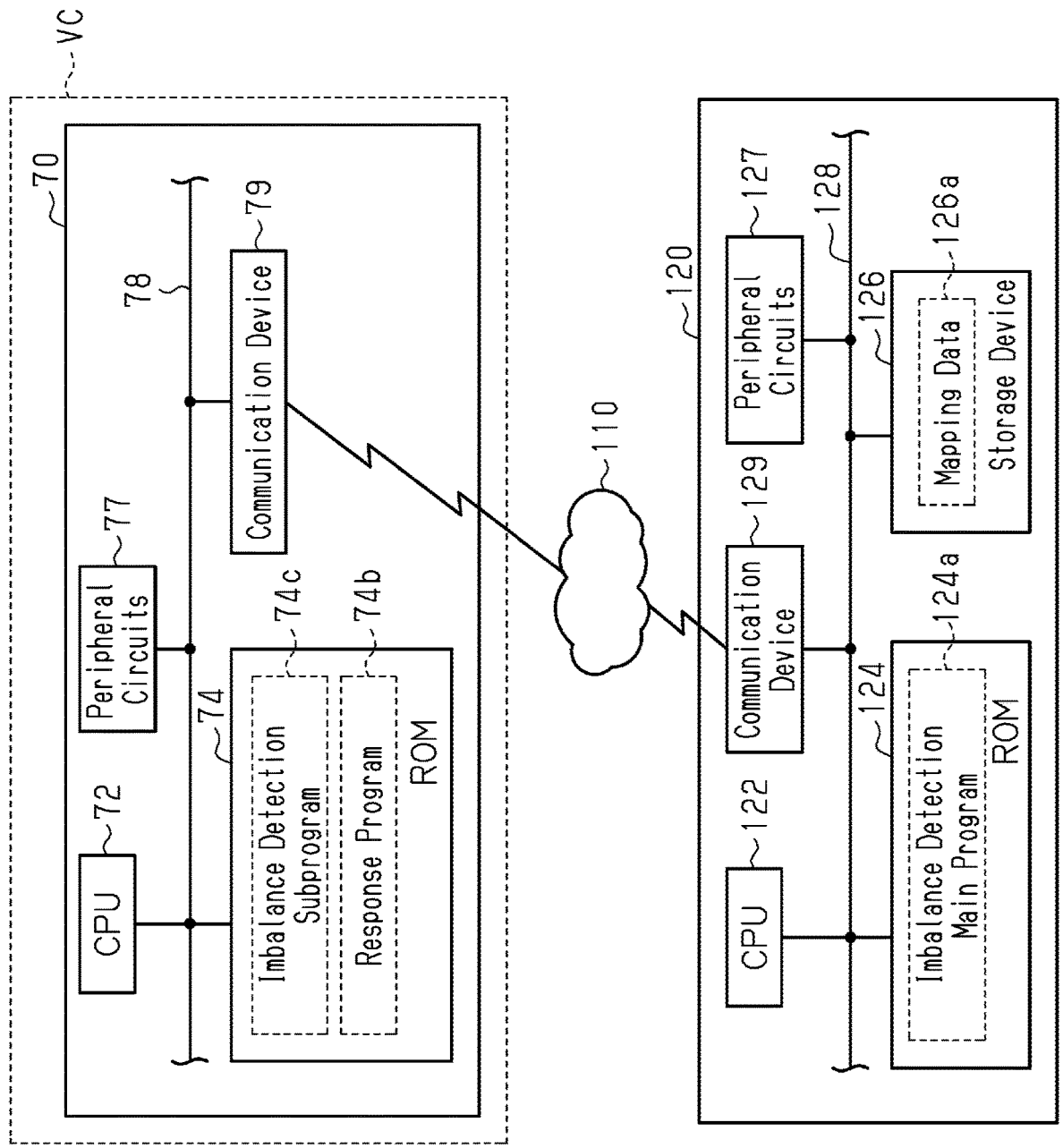
FIG. 17 is a view showing a configuration of an imbalance detection system according to a ninth embodiment.
Figure 18:
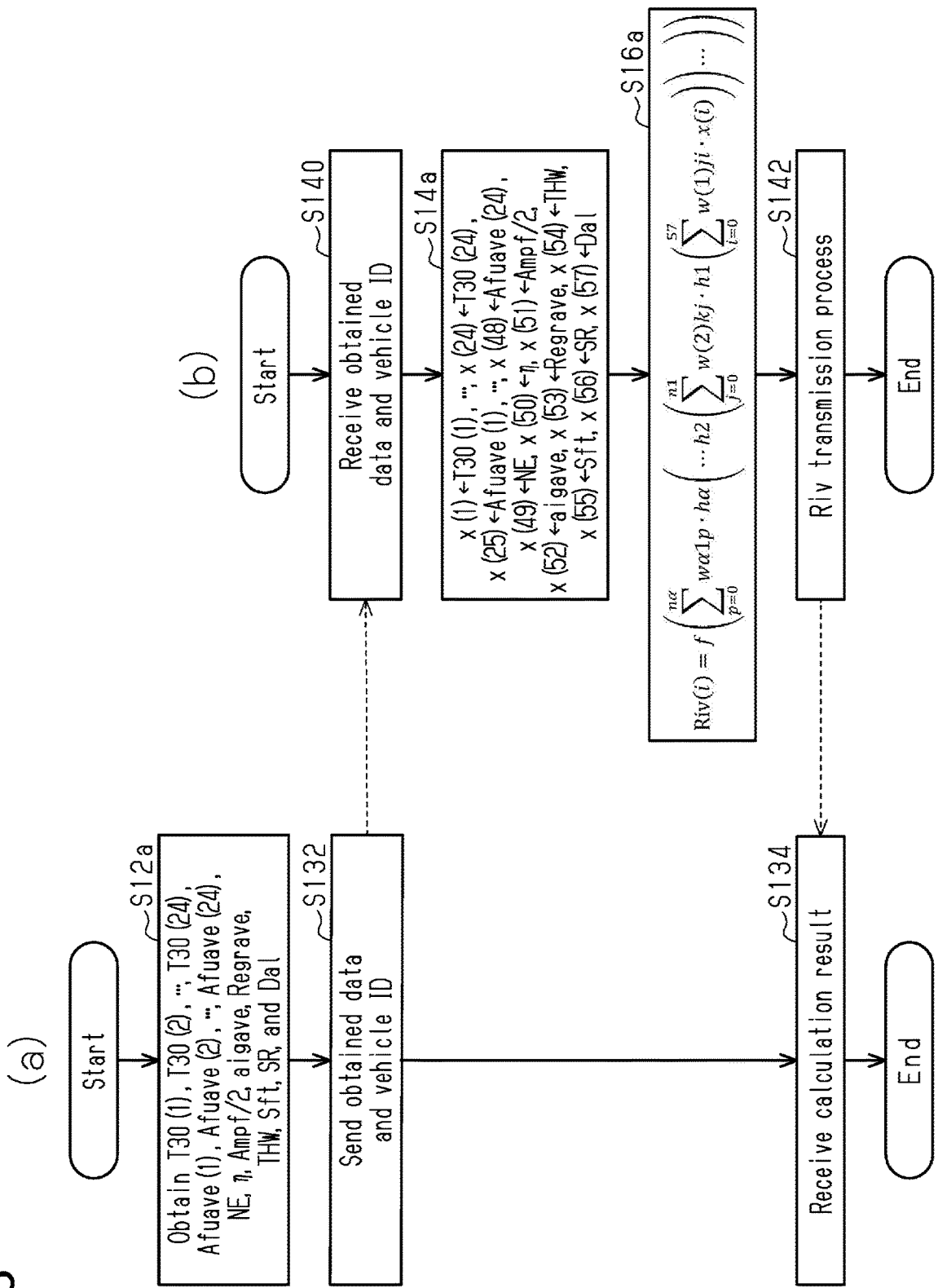
FIG. 18 is a flowchart including section (a) and section (b) showing a procedure of a process executed by the imbalance detection system of FIG. 17.

Referring to FIGS. 17 and 18, a ninth embodiment is now described focusing on the differences from the first embodiment.

In the present embodiment, the calculation process for the imbalance ratio Riv(i) is performed outside the vehicle.

FIG. 17 shows an imbalance detection system according to the present embodiment. In FIG. 17, members corresponding to those shown in FIG. 1 are denoted by the same reference numerals for the sake of convenience.

A controller 70 in the vehicle VC shown in FIG. 17 includes a communication device 79. The communication device 79 is a device for communicating with the center 120 via the network 110 outside the vehicle VC.

The center 120 analyzes data transmitted from the vehicles VC. The center 120 includes a CPU 122, a ROM 124, a storage device 126, a peripheral circuit 127, and a communication device 129, which can communicate with each other via a local network 128. The ROM 124 stores an imbalance detection main program 124a, and the storage device 126 stores mapping data 126a.

FIG. 18 shows a procedure of a process executed by the system shown in FIG. 17. The process shown in section (a) of FIG. 18 is performed by the CPU 72 executing the imbalance detection subprogram 74c stored in the ROM 74 shown in FIG. 17. Furthermore, the process shown in section (b) of FIG. 18 is performed by the CPU 122 executing the imbalance detection main program 124a stored in the ROM 124. In FIG. 18, processes corresponding to the processes shown in FIG. 16 are given the same step numbers for the sake of convenience. Hereinafter, the process shown in FIG. 18 will be described along the time series of the imbalance detection process.

As shown in section (a) of FIG. 18, in the vehicle VC, the CPU 72, after completing the process of S12a, operates the communication device 79 to transmit the data obtained in the process of S12a to the center 120 along with a vehicle ID, which is the identification information of the vehicle VC (S132).

The CPU 122 of the center 120, in turn, receives the transmitted data (S140), and executes the processes of S14a and S16a, as shown in section (b) of FIG. 18. The CPU 122 then operates the communication device 129 to transmit a signal related to the imbalance ratio Riv(i) to the vehicle VC to which the data received by the process of S140 is transmitted (S142), and temporarily terminates the series of processes shown in section (b) of FIG. 18. The CPU 72, in turn, receives a signal relating to the imbalance ratio Riv(i) (S134), and temporarily terminates the series of processes shown in section (a) of FIG. 18, as shown in section (a) of FIG. 18.

Thus, in the present embodiment, the imbalance ratio Riv is calculated in the center 120, so that the computation load of the CPU 72 can be reduced.

<Correspondence>

The correspondences between the features in the embodiments described above and the features described in the SUMMARY are as follows. Below, the correspondence is shown for each of the numbers in the examples described in the above SUMMARY.

[1], [7] The imbalance detection device corresponds to the controller 70. The execution device corresponds to the CPU 72 and the ROM 74. The storage device corresponds to the storage device 76.

The predetermined rotational angular interval corresponds to 720° CA, and the first interval and the second interval correspond to 30° CA. The air-fuel ratio detection variable corresponds to the upstream-side average value Afuave, and the instantaneous speed variable corresponds to the minute rotation duration T30. The rotation waveform variables correspond to minute rotation durations T30(1) to T30(24).

The obtainment process corresponds to the processes of S12 and S12a. The calculation process corresponds to the processes of S14 and S16 and the processes of S14a and S16a. The response process corresponds to the processes of S24, S26, S64, S68, S70, S74, S78, and S82.

[2] The half order component variable corresponds to the half order amplitude Ampf/2.

[3] The operating point variables correspond to the rotational speed NE and the charging efficiency η.

[4] The moderator variables correspond to the ignition timing average value aigave and the EGR ratio average value Regrave.

[5] The driveline system state variable corresponds to the shift position Sft.

[6] The road surface state variable corresponds to the road surface state variable SR.

[8] The selection process corresponds to the processes of FIGS. 12 to 15.

[9] The adjustment device corresponds to the purge valve 44. The imbalance variable corresponding to the presence or absence of the influence of the fuel vapor corresponds to the imbalance ratio Riv when an affirmative determination is made in the process of S52 and the imbalance ratio Riv when a negative determination is made.

[10] The first learned value corresponds to the imbalance learned value Liv shown in FIGS. 9 and 10, and the second learned value corresponds to the purge learned value Livp shown in FIGS. 9 and 10.

[11] The imbalance variable corresponding to the presence or absence of the influence of the exhaust gas flowing in through the EGR passage corresponds to the imbalance ratio Riv when an affirmative determination is made in the process of S56 and the imbalance ratio Riv when a negative determination is made.

[12] The first learned value corresponds to the imbalance learned value Liv and the purge learned value Livp shown in FIGS. 9 and 10, and the second learned value corresponds to the EGR learned value Live shown in FIGS. 9 and 10.

[13] An operation portion (combustion operation portion) for controlling combustion corresponds to the fuel injection valve 20 and the ignition device 22.

[14] Different correction amounts correspond to ΔQd.

[15] The first execution device corresponds to the CPU 72 and the ROM 74. The second execution device corresponds to the CPU 122 and the ROM 124. The calculation process corresponds to the processes of S14a and S16a in FIG. 18. The vehicle-side transmission process corresponds to the process of S132, and the vehicle-side reception process corresponds to the process of S134. The external reception process corresponds to the process of S140, and the external transmission process corresponds to the process of S142.

[16] The data analysis device corresponds to the center 120.

[17] The controller of the internal combustion engine corresponds to the controller 70 shown in FIG. 16.

[23] Machine learning corresponds to the processes of FIGS. 5 and 6.

Other Embodiments

The embodiment described above may be modified as follows. The embodiments and the following modifications may be combined to the extent that does not cause technical contradiction.

Regarding First Interval and Second Interval

The first interval, which is the sampling interval of the upstream-side average value Afuave to become the input to the mapping, is not limited to 30° CA. For example, it may be an angular interval smaller than 30° CA, such as 10° CA. However, it is not limited to an angular interval of lower than or equal to 30° CA, and may be, for example, 45° CA, or the like.

The second interval, which is the sampling interval of the minute rotation duration T30 to become the input to the mapping, is not limited to 30° CA. For example, it may be an angular interval smaller than 30° CA, such as 10° CA. However, it is not limited to an angular interval of lower than or equal to 30° CA, and may be, for example, 45° CA, or the like.

It is not essential that the first interval and the second interval are intervals of the same size.

Regarding Predetermined Rotational Angular Interval (Predetermined Angular Interval)

The time series data of the upstream-side average value Afuave and the time series data of the minute rotation duration T30 to become the input to the mapping are not limited to the time series data at the rotational angular interval of 720°. For example, it may be the time series data at the rotational angular interval wider than 720° CA. In addition, for example, as described in the section "Regarding Plurality of Types of Mapping Data" below, when a mapping that outputs only the imbalance ratio Riv(i) of a specific cylinder #i is used, it may be the time series data of an angular interval narrower than 720° CA.

Furthermore, for example, when the time series data of the minute rotation duration T30 in the first predetermined period and the time series data of the upstream-side average value Afuave in the second predetermined period are the input to the mapping, one of the first predetermined period and the second predetermined period may be delayed with respect to the other one. It is not essential that the first predetermined period and the second predetermined period are periods having angular intervals equal to each other.

Regarding Rotation Waveform Variable as Input to Mapping

In the embodiment described above, the minute rotation duration T30 in each of intervals obtained by dividing the rotational angular interval of 720° CA, which is one combustion cycle, is used as an input to the mapping, but this is not the sole case. For example, among 0 to 720° CA, 0 to 20, 40 to 60, 80 to 100, 120 to 140, 160 to 180, . . . , 700 to 720° CA each may be used as the second interval, and the time required for their rotation may be adopted as an input to the mapping.

The instantaneous speed variable is not limited to the minute rotation duration, which is the time required for the rotation of the second interval. For example, it may be a value obtained by dividing the second interval by the minute rotation duration. It is not essential that the instantaneous speed variable has been subjected to normalization processing in which the difference between the local maximum (maximum value) and the local minimum (minimum value) is a fixed value. Furthermore, the filtering process as the pre-process to be performed on the instantaneous speed variable in order to set the instantaneous speed variable as input to the mapping is not limited to the above, and for example, the process for removing the influence of the rotation of the crankshaft 24 by the input shaft 66 may be performed on the instantaneous speed variable based on the minute rotation duration of the input shaft 66 of the transmission 64. However, it is not essential that the filtering is performed on the instantaneous speed variable serving as an input to the mapping.

The rotation waveform variable serving as an input to the mapping is not limited to the time series data of the instantaneous speed variable. For example, it may be time series data of a difference between a pair of instantaneous speed variables separated by an appearance interval of compression top dead center. At this time, the instantaneous speed variable is a value obtained by assuming the angular interval less than or equal to the appearance interval of the compression top dead center as the second interval, dividing the minute rotation duration which is the time required for the rotation or the second interval by the minute rotation duration.

Regarding Air-Fuel Ratio Detection Variable as Input to Mapping,

In the embodiment described above, the upstream-side average value Afuave at each of intervals obtained by dividing the rotational angular interval of 720° CA, which is one combustion cycle, is used as an input to the mapping, but this is not the sole case. For example, among 0 to 720° CA, 0 to 20, 40 to 60, 80 to 100, 120 to 140, 160 to 180, . . . , 700 to 720 each may be used as the first interval, and the upstream-side average value Afuave may be used as the input to the mapping.

In the embodiment described above, the upstream-side average value Afuave is used as the average value of sampling values in one first interval, but this is not the sole case. For example, the upstream-side average value Afuave may be calculated by sampling the upstream detection value Afu in each of the first intervals over a plurality of combustion cycles and averaging them for each first interval.

The air-fuel ratio detection variable is not limited to the upstream-side average value Afuave, but may be the upstream detection value Afu.

Regarding Operating Point Variable of Internal Combustion Engine,

In the embodiment described above, the operating point variable is defined by the rotational speed NE and the charging efficiency η, but the present invention is not limited thereto. For example, the rotational speed NE and the intake air amount Ga may be used. Furthermore, for example, the injection amount or the required torque for the internal combustion engine may be used as the load instead of the charging efficiency η. The use of the injection amount or the required torque as the load is particularly effective in the compression ignition type internal combustion engine described in the section "Regarding Internal Combustion Engine" below.

Regarding Moderator Variable that Adjusts Combustion Speed of Air-Fuel Mixture as Input to Mapping, In the process of S16a, the ignition timing average value aigave and the EGR ratio average value Regrave are used as an input to mapping and as moderator variables for adjusting the combustion speed, but for example, only one of the two parameters may be used.

The ignition variable serving as a variable indicating the ignition timing is not limited to the ignition timing average value aigave and may be the ignition timing aig. The variable indicating the EGR ratio is not limited to the EGR ratio average value Regrave, and may be an EGR ratio Regr.

Furthermore, for example, when applied to a compression ignition type internal combustion engine as described in the section "Regarding Internal Combustion Engine" below, the injection timing and its average value may be used instead of the ignition variable.

The moderator variable that serves as an input to mapping and adjusts the combustion speed is not limited to the above variable, and for example, may be the valve opening timing and lift amount of the intake valve 16, the valve opening timing and lift amount of the exhaust valve 26, and the like. Furthermore, for example, in the cylinder pause control in which the combustion control of the air-fuel mixture is stopped in some cylinders, the moderator variable may be information on the cylinder in which the combustion control is stopped. Moreover, for example, in a case of the internal combustion engine 10 including a supercharger and a wastegate valve, it may be the opening degree of the wastegate valve.

Regarding Driveline System State Variable as Input to Mapping

In the process of S16a, the shift position Sft is used as the state variable of the driveline system connected to the crankshaft 24, but this is not the sole case. For example, it may be the state of the lockup clutch 62. This state may be a binary state, for example, the engaged state or the released state, but may identify each of the engaged state, the released state, and the slip state.

Furthermore, for example, the state variable of the driveline system may be the oil temperature of the transmission 64. Moreover, for example, it may be the rotational speed of the drive wheels 69. As described in the section "Regarding Vehicle" below, when the internal combustion engine 10 and the motor generator are provided as devices for generating thrust, the torque and rotational speed of the motor generator may be included. The number of state variables of the driveline system to become the input to the mapping is not limited to one.

Regarding Road Surface State Variable as Input to Mapping

The road surface state variable SR is not limited to a binary variable corresponding to the magnitude of the undulation of the road surface, and may be, for example, a variable having three or more values corresponding to the magnitude of the undulation. Furthermore, the method of generating the road surface state variable SR based on the acceleration Dacc is not limited to the method illustrated in FIG. 15, and for example, an average value per predetermined time of the absolute value of the acceleration Dacc may be used. Accordingly, the road surface state variable SR becomes a continuous quantity.

The road surface state variable SR is not limited to that is quantified based on the detection value of the acceleration in the vertical direction of the vehicle VC. For example, it may be quantified by the acceleration in the lateral direction of a vehicle, and the acceleration in the front-back direction. Furthermore, the input to the mapping may be quantified using any two or all of the three accelerations: acceleration in the vertical direction of the vehicle; acceleration in the lateral direction; and acceleration in the front-back direction.

The road surface state variable SR used for the process of S16a is quantified by the acceleration Dacc detected by the acceleration sensor 92, but is not limited thereto. For example, analysis result data of imaging data of the road surface obtained by a camera or data related to the reflected wave of the radar may be used. Furthermore, for example, the road surface state at the current location may be obtained using map data including the road surface state and GPS, and this may be used. Moreover, the air pressure of each wheel may be used. That is, the difference in air pressure of the wheels includes information on the inclination and unevenness of the road surface. For example, a detection value of a sensor that detects the position of the liquid level of the fluid in the vehicle such as a fuel gauge or an oil gauge may be used. That is, the liquid level fluctuation includes information such as unevenness of the road surface. A detection value of a sensor that detects the hydraulic pressure of the suspension may be used. That is, the hydraulic pressure includes information such as unevenness of the road surface.

The road surface state variable is not limited to that in which the unevenness of the road surface and the like is quantified. For example, it may that in which the size of friction of the road surface such as the presence or absence of freezing is quantified, or a variable that identifies both of the undulation of the road surface and the size of friction.

Regarding Input to Mapping

The input to the mapping is not limited to those in the embodiment and the modified example described above. For example, a parameter relating to the environment in which the internal combustion engine 10 is placed may be used. Specifically, for example, the atmospheric pressure may be used. For example, the intake air temperature, which is a parameter that affects the combustion speed of the air-fuel mixture in the combustion chamber 18, may be used. Further, for example, humidity, which is a parameter that affects the combustion speed of the air-fuel mixture in the combustion chamber 18, may be used. In addition, although a humidity sensor may be used for grasping humidity, the detection value of a sensor that detects the state of a wiper, or a raindrop may be used. Furthermore, it may be data relating to the state of an auxiliary machine mechanically coupled to the crankshaft 24.

It is not essential to include the operating point of the internal combustion engine 10 in the input to the mapping.

For example, as described in the section "Regarding Internal Combustion Engine" below, when assumed that the internal combustion engine is mounted to a series hybrid vehicle and a control in which the operating point is limited to a narrow range is performed, the imbalance ratio Riv(i) can be calculated with high accuracy without including the operating point.

Regarding Mapping Data for Each Control Mode

The mapping data for each control mode is not limited to being provided for each of the warm-up control mode of the catalyst 30 and the mode after completion of warm-up, as illustrated in FIG. 12. For example, as described in the section "Regarding Internal Combustion Engine 10" below, in a case where an internal combustion engine includes both of a port injection valve and an in-cylinder injection valve, it may be provided separately for a mode in which fuel injection control only by the port injection valve is performed and a mode in which the fuel injection control using the in-cylinder injection valve is performed.

Regarding Mapping Data for Each State Variable of Internal Combustion Engine as Result of Control In FIG. 13, three types of mapping data for each rotational speed NE are provided, but this is not the sole case, and two types or four or more types of mapping data may be provided.

Assuming that the state variable of the internal combustion engine 10 is the result of the control, the mapping data for each state variable of the internal combustion engine 10 serving as a result of the control is not limited to the mapping data for each rotational speed NE illustrated in FIG. 13. For example, it may be provided for every charging efficiency $\eta$. Furthermore, for example, it may be provided for each operating point of the internal combustion engine 10 such as for the rotational speed NE, the charging efficiency $\eta$, and the like.

Regarding Mapping Data for Each Driveline System State Variable

For example, as described in the section "Others" below, when a stepless transmission is used as a transmission, mapping data may be provided for each of regions obtained by dividing a region the gear ratio may take into plurals.

The mapping data for each driveline system state variable connected to the crankshaft 24 is not limited to the mapping data for each shift position Sft. For example, instead of using the driveline system state variable described in the section "Regarding Driveline System State Variable as Input to Mapping" as input to mapping, the mapping data may be provided for each of the same state variables. However, when mapping data is provided for each state variable, it is not essential to not include the state variable in the input to mapping.

Regarding Mapping Data for Each Road Surface State Variable

The mapping data for each road surface state variable is not limited to that illustrated in FIG. 15. For example, instead of using the road surface state variable SR described in the section "Regarding Road Surface State Variable as Input to Mapping" as input to mapping, a mapping may be provided for each road surface state variable SR. However, when a mapping is provided for each road surface state variable SR, it is not essential that the road surface state variable SR is not included in the input to the mapping.

Regarding Plurality of Types of Mapping Data

Providing a plurality of types of mapping data is not limited to providing for each state variable of the internal combustion engine 10 serving as a result of control, providing for each control mode, providing for each driveline system state variable, and providing for each road surface state variable. For example, instead of using the moderator variable described in the section "Regarding Moderator Variable for Adjusting Combustion Speed of Air-Fuel Mixture as Input to Mapping" as input to mapping, mapping data may be provided for each moderator variable. However, when the mapping data is provided for each moderator variable such as an EGR variable, it is not essential that the moderator variable is not included in the input to the mapping. Furthermore, for example, instead of using the parameter related to the environment in which the internal combustion engine is placed as described in the section "Regarding Input to Mapping" as input to mapping, mapping data may be provided for each parameter related to the environment. However, when mapping data is provided for each parameter relating to the environment, it is not essential that the parameter is not included in the input to mapping.

Furthermore, for example, different mapping data may be provided for the case where the target purge ratio Rp* is zero and the case where the target purge ratio Rp* is greater than zero.

Moreover, the plurality of types of mapping data may be a combination of several of the above mapping data. That is, for example, mapping data for each shift position Sft may be further subdivided into mapping data for each rotational speed NE.

In addition, limiting to the imbalance ratio Riv of a specific cylinder, the mapping data defining the mapping that outputs such an imbalance ratio may be provided by the number of cylinders.

Regarding Mapping Data

For example, in the process of S16a in FIG. 16, the number of intermediate layers of the neural network may be two or more.

In the process of S16a in each of FIGS. 16 and 18, in the expression of the mathematical expression, the number of intermediate layers of the neural network is expressed as more than two layers ($\alpha > 2$), but this is not the sole case. In particular, from the standpoint of reducing the computation load of the controller 70, it is desirable to limit the number of intermediate layers of the neural network to one or two layers.

In the embodiment described above, the activation functions h, f, h1, h2, ... h$\alpha$ are hyperbolic tangents, but this is not the sole case. For example, a part of or all of the activation functions h, h1, h2, ... h$\alpha$ may be ReLU, or may be for example, a logistic sigmoid function.

In FIG. 3 and the like, the mapping that outputs the imbalance ratio Riv is not limited to that learned for a phenomenon in which the fuel injection amount is deviated from what is assumed only in any one cylinder. For example, in two cylinders, learning may be performed for a phenomenon in which the fuel injection amount is deviated from what is assumed. In this case, the intensity of the primary component of the rotation frequency of the crankshaft 24 may be included in the input to the mapping.

For the input to the neural network, each dimension is not limited to including a single physical quantity. For example, for some of the types of physical quantities using the physical quantity described above, instead of using them as a direct input to the neural network, some principal components from their principal component analysis may be adopted as the direct input to the neural network. However, when the principal component is input to the neural network, it is not essential that only a part of the input to the neural network is the principal component, and the entire input may be the principal component. When the principal component is included in the input to the neural network, the mapping data 76a and 126a include data defining a mapping that defines the principal component.

Regarding Machine Learning Algorithms

The machine learning algorithm is not limited to using a neural network. For example, a regression formula may be used. This corresponds to the neural network without an intermediate layer.

Regarding Generation of Mapping Data

In the embodiment described above, the data when the internal combustion engine 10 is operated in a state where the dynamometer 100 connected to the crankshaft 24 through the torque converter 60 and the transmission 64 is used as training data, but this is not the sole case. For example, data obtained when the internal combustion engine 10 is driven in a state where the internal combustion engine 10 is mounted to the vehicle VC may be used as training data.

Regarding Data Analysis Device

At the center 120, the process of S22 and the process of notifying that there is an abnormality to the user's mobile terminal instead of the process of S24 may be executed.

The process of section (b) of FIG. 18 may be executed by, for example, a mobile terminal owned by the user.

Regarding Execution Device

The execution device is not limited to a device that includes the CPU 72 (122) and the ROM 74 (124) and executes software processing. For example, the execution device may include an application-specific hardware circuit (e.g., ASIC) that performs at least part of the process performed by software in the embodiment described above. That is, the execution device may have any of the following configurations (a) to (c). (a) The execution device includes a processor, which executes all the processes described above following a program, and a program storage device such as a ROM, which stores the program (including a non-transitory computer-readable recording medium). (b) The execution device includes a processor, which performs some of the processes described above following a program, a program storage device, and a dedicated hardware circuit that performs the rest of the processes. (c) The execution device includes a dedicated hardware circuit that performs all of the processes described above. The execution device may include software processing devices including a processor and a program storage device, and dedicated hardware circuits.

Regarding Storage Device

In the embodiment described above, the storage device storing the mapping data 76a, 126a is a storage device different from the storage device (ROM 74, 124) storing the imbalance detection program 74a and the imbalance detection main program 124a, but this is not the sole case.

Regarding Internal Combustion Engine

In the embodiment described above, the in-cylinder injection valve that injects fuel into the combustion chamber 18 is illustrated as the fuel injection valve, but this is not the sole case. For example, the fuel injection valve may be a port injection valve that injects fuel into the intake passage 12. For example, both of the port injection valve and the in-cylinder injection valve may be provided.

The internal combustion engine is not limited to a spark ignition type internal combustion engine, and may be for example, a compression ignition type internal combustion engine using light oil or the like as fuel.

It is not essential that the internal combustion engine configures the driveline system. For example, the crankshaft may be mechanically coupled to the in-vehicle power generator, and the drive wheels 69 may be that in which the internal combustion engine is mounted to a so-called series hybrid vehicle in which power transmission from the internal combustion engine is blocked.

Regarding Vehicle

The vehicle is not limited to a vehicle in which the device for generating the propulsive force of the vehicle is only the internal combustion engine, and for example, may be a parallel hybrid vehicle or a series/parallel hybrid vehicle other than the series hybrid vehicle described in the section "Regarding Internal Combustion Engine."

Others

The driveline system interposed between the crankshaft and the drive wheel is not limited to a stepped transmission, and may be for example, a stepless transmission.

What is claimed is:

1. An imbalance detection device applied to a multi-cylinder internal combustion engine, the imbalance detection device comprising:

memory circuitry; and processing circuitry, wherein the memory circuitry is configured to store mapping data that is data defining a mapping, the mapping constituting a machine learning algorithm, the mapping data including data learned by machine learning, the mapping including a neural network having an input-side nonlinear mapping that nonlinearly converts each output of an input-side linear mapping and an output-side nonlinear mapping that nonlinearly converts each output of an output-side linear mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine, the processing circuitry is configured to execute an obtainment process of obtaining the rotation waveform variable based on a detection value of a sensor that detects a rotational behavior of a crankshaft, and the air-fuel ratio detection variable in each of a plurality of first intervals, a calculation process of calculating the imbalance variable based on an output of the mapping having a value obtained by the obtainment process as the input, and a response process of operating predetermined hardware based on a calculation result of the calculation process to respond to a large degree of variations in the air-fuel ratio, the rotation waveform variable is a variable indicating a difference between instantaneous speed variables that are variables corresponding to a rotational speed of the crankshaft in each of a plurality of second intervals, the first interval and the second interval are both angular intervals of the crankshaft smaller than an appearance interval of a compression top dead center, and the rotation waveform variables and the air-fuel ratio detection variables, which are inputs to the mapping, are respectively time series data within a predetermined angular interval larger than the appearance interval.

2. The imbalance detection device according to claim 1, wherein the input to the mapping includes an operating point variable that is a variable defining an operating point of the internal combustion engine, the obtainment process includes a process of obtaining the operating point variable, and the calculation process is a process of calculating the imbalance variable based on the output of the mapping in which the operating point variable obtained by the obtainment process is further included in the input to the mapping.

3. The imbalance detection device according to claim 1, wherein the input to the mapping includes moderator variables that are variables for adjusting a combustion speed of an air-fuel mixture in a combustion chamber of the internal combustion engine by an operation of an operation portion of the internal combustion engine, the obtainment process includes a process of obtaining the moderator variable, and the calculation process is a process of calculating the imbalance variable based on the output of the mapping in which the moderator variable obtained by the obtainment process is further included in the input to the mapping.

4. The imbalance detection device according to claim 1, wherein the input to the mapping includes a driveline system state variable that is a variable indicating a state of a driveline system connected to the crankshaft, the obtainment process includes a process of obtaining the driveline system state variable, and the calculation process is a process of calculating the imbalance variable based on the output of the mapping in which the driveline system state variable obtained by the obtainment process is further included in the input to the mapping.

5. The imbalance detection device according to claim 1, wherein the rotation waveform variable is configured as a variable indicating a difference between the instantaneous speed variables by the instantaneous speed variable in each of the second intervals, the obtainment process includes a process of obtaining the instantaneous speed variable in each of the second intervals as the rotation waveform variable, and the calculation process is a process of calculating the imbalance variable by having the instantaneous speed variable in each of the second intervals as the input to the mapping as the rotation waveform variable.

6. The imbalance detection device according to claim 1, wherein the memory circuitry includes a plurality of types of the mapping data, and the calculation process includes a selection process of selecting the mapping data to be used for calculating the imbalance variable from the plurality of types of mapping data.

7. The imbalance detection device according to claim 1, wherein the predetermined hardware includes a combustion operation portion for controlling the combustion of an air-fuel mixture in a combustion chamber of the internal combustion engine, and the response process includes an operation process of operating the combustion operation portion according to the imbalance variable when the degree of variations in the air-fuel ratio is large.

8. The imbalance detection device according to claim 7, wherein the operation process includes a process of operating a fuel injection valve serving as the combustion operation portion for supplying fuel to each of a plurality of cylinders.

9. An imbalance detection system comprising the processing circuitry and the memory circuitry according to claim 1, wherein
the processing circuitry includes first processing circuitry and second processing circuitry,
the first processing circuitry is mounted to a vehicle and is configured to execute
the obtainment process,
a vehicle-side transmission process for transmitting the data obtained by the obtainment process to the outside of the vehicle,
a vehicle-side reception process for receiving a signal based on the calculation result of the calculation process, and
the response process, and
the second processing circuitry is disposed outside the vehicle and is configured to execute
an external reception process for receiving the data transmitted by the vehicle-side transmission process,
the calculation process, and
an external transmission process for transmitting a signal based on the calculation result of the calculation process to the vehicle.

10. The imbalance detection device according to claim 1, wherein the rotation waveform variable is a variable corresponding to a rotational speed of the crankshaft in each of a plurality of consecutive second intervals included in one of the first intervals.

11. An imbalance detection device applied to a multi-cylinder internal combustion engine, the imbalance detection device comprising:
memory circuitry; and
processing circuitry, wherein
the memory circuitry is configured to store mapping data that is data defining a mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine,
the processing circuitry is configured to execute
an obtainment process of obtaining the rotation waveform variable based on a detection value of a sensor that detects a rotational behavior of a crankshaft, and the air-fuel ratio detection variable in each of a plurality of first intervals,
a calculation process of calculating the imbalance variable based on an output of the mapping having a value obtained by the obtainment process as the input, and
a response process of operating predetermined hardware based on a calculation result of the calculation process to respond to a large degree of variations in the air-fuel ratio,
the rotation waveform variable is a variable indicating a difference between instantaneous speed variables that are variables corresponding to a rotational speed of the crankshaft in each of a plurality of second intervals,
the first interval and the second interval are both angular intervals of the crankshaft smaller than an appearance interval of a compression top dead center,
the rotation waveform variables and the air-fuel ratio detection variables, which are inputs to the mapping, are respectively time series data within a predetermined angular interval larger than the appearance interval,
the input to the mapping includes a half order component of a rotation frequency of the crankshaft based on the detection value of the sensor that detects the rotational behavior of the crankshaft,
the obtainment process includes a process of obtaining a half order component variable that is a variable defining the half order component, and
the calculation process is a process of calculating the imbalance variable based on the output of the mapping in which the half order component variable obtained by the obtainment process is further included in the input to the mapping.

12. The imbalance detection device according to claim 11, wherein the mapping data includes data learned by machine learning.

13. An imbalance detection device applied to a multi-cylinder internal combustion engine, the imbalance detection device comprising:
memory circuitry; and
processing circuitry, wherein
the memory circuitry is configured to store mapping data that is data defining a mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine,
the processing circuitry is configured to execute
an obtainment process of obtaining the rotation waveform variable based on a detection value of a sensor that detects a rotational behavior of a crankshaft, and the air-fuel ratio detection variable in each of a plurality of first intervals,
a calculation process of calculating the imbalance variable based on an output of the mapping having a value obtained by the obtainment process as the input, and
a response process of operating predetermined hardware based on a calculation result of the calculation process to respond to a large degree of variations in the air-fuel ratio,
the rotation waveform variable is a variable indicating a difference between instantaneous speed variables that are variables corresponding to a rotational speed of the crankshaft in each of a plurality of second intervals,
the first interval and the second interval are both angular intervals of the crankshaft smaller than an appearance interval of a compression top dead center,
the rotation waveform variables and the air-fuel ratio detection variables, which are inputs to the mapping, are respectively time series data within a predetermined angular interval larger than the appearance interval,
the input to the mapping includes a road surface state variable that is a variable indicating a state of a road surface on which a vehicle to which the internal combustion engine is mounted travels,
the obtainment process includes a process of obtaining the road surface state variable, and
the calculation process is a process of calculating the imbalance variable based on the output of the mapping in which the road surface state variable obtained by the obtainment process is further included in the input to the mapping.

14. The imbalance detection device according to claim 13, wherein the mapping data includes data learned by machine learning.

15. An imbalance detection device applied to a multi-cylinder internal combustion engine, the imbalance detection device comprising:
memory circuitry; and
processing circuitry, wherein
the memory circuitry is configured to store mapping data that is data defining a mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine,
the processing circuitry is configured to execute
an obtainment process of obtaining the rotation waveform variable based on a detection value of a sensor that detects a rotational behavior of a crankshaft, and the air-fuel ratio detection variable in each of a plurality of first intervals,
a calculation process of calculating the imbalance variable based on an output of the mapping having a value obtained by the obtainment process as the input, and
a response process of operating predetermined hardware based on a calculation result of the calculation process to respond to a large degree of variations in the air-fuel ratio,
the rotation waveform variable is a variable indicating a difference between instantaneous speed variables that are variables corresponding to a rotational speed of the crankshaft in each of a plurality of second intervals,
the first interval and the second interval are both angular intervals of the crankshaft smaller than an appearance interval of a compression top dead center,
the rotation waveform variables and the air-fuel ratio detection variables, which are inputs to the mapping, are respectively time series data within a predetermined angular interval larger than the appearance interval,
the internal combustion engine includes
a canister that collects fuel vapor in a fuel tank that stores fuel to be injected from a fuel injection valve,
a purge passage that connects the canister and an intake passage of the internal combustion engine to each other, and
an adjustment device for adjusting a flow rate of the fuel vapor flowing from the canister into the intake passage through the purge passage,
the calculation process includes both of
a process of calculating the imbalance variable by having data obtained by the obtainment process when the flow rate of the fuel vapor is zero as the input to the mapping, and a process of calculating the imbalance variable by having data obtained by the obtainment process when the flow rate of the fuel vapor is greater than zero as the input to the mapping, and
the response process is a process of, when the flow rate of the fuel vapor is greater than zero, operating the predetermined hardware based on the imbalance variable calculated by having the data obtained by the obtainment process when the flow rate of the fuel vapor is greater than zero as the input to the mapping.

16. The imbalance detection device according to claim 15, wherein the mapping data includes data learned by machine learning.

17. An imbalance detection device applied to a multi-cylinder internal combustion engine, the imbalance detection device comprising:
memory circuitry; and
processing circuitry, wherein
the memory circuitry is configured to store mapping data that is data defining a mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine,
the processing circuitry is configured to execute
an obtainment process of obtaining the rotation waveform variable based on a detection value of a sensor that detects a rotational behavior of a crankshaft, and the air-fuel ratio detection variable in each of a plurality of first intervals,
a calculation process of calculating the imbalance variable based on an output of the mapping having a value obtained by the obtainment process as the input, and
a response process of operating predetermined hardware based on a calculation result of the calculation process to respond to a large degree of variations in the air-fuel ratio,
the rotation waveform variable is a variable indicating a difference between instantaneous speed variables that are variables corresponding to a rotational speed of the crankshaft in each of a plurality of second intervals,
the first interval and the second interval are both angular intervals of the crankshaft smaller than an appearance interval of a compression top dead center,
the rotation waveform variables and the air-fuel ratio detection variables, which are inputs to the mapping, are respectively time series data within a predetermined angular interval larger than the appearance interval,
the internal combustion engine includes
a canister that collects fuel vapor in a fuel tank that stores fuel to be injected from a fuel injection valve,
a purge passage that connects the canister and an intake passage of the internal combustion engine to each other, and
an adjustment device for adjusting a flow rate of the fuel vapor flowing from the canister into the intake passage through the purge passage,
the calculation process includes both of
a process of calculating the imbalance variable by having data obtained by the obtainment process when the flow rate of the fuel vapor is zero as the input to the mapping, and calculating a first learned value from the imbalance variable and storing the first learned value, and a process of calculating the imbalance variable by having data obtained by the obtainment process when the flow rate of the fuel vapor is greater than zero as the input to the mapping, and calculating a second learned value from the imbalance variable and storing the second learned value, and the response process is a process of, when the flow rate of the fuel vapor is zero, operating the predetermined hardware by selectively using the first learned value of the stored first learned value and the second learned value.

18. The imbalance detection device according to claim 17, wherein the mapping data includes data learned by machine learning.

19. An imbalance detection device applied to a multi-cylinder internal combustion engine, the imbalance detection device comprising:

memory circuitry; and
processing circuitry, wherein
the memory circuitry is configured to store mapping data that is data defining a mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine, the processing circuitry is configured to execute
an obtainment process of obtaining the rotation waveform variable based on a detection value of a sensor that detects a rotational behavior of a crankshaft, and the air-fuel ratio detection variable in each of a plurality of first intervals, a calculation process of calculating the imbalance variable based on an output of the mapping having a value obtained by the obtainment process as the input, and a response process of operating predetermined hardware based on a calculation result of the calculation process to respond to a large degree of variations in the air-fuel ratio, the rotation waveform variable is a variable indicating a difference between instantaneous speed variables that are variables corresponding to a rotational speed of the crankshaft in each of a plurality of second intervals, the first interval and the second interval are both angular intervals of the crankshaft smaller than an appearance interval of a compression top dead center, the rotation waveform variables and the air-fuel ratio detection variables, which are inputs to the mapping, are respectively time series data within a predetermined angular interval larger than the appearance interval, the internal combustion engine includes
an EGR passage that connects an exhaust passage and an intake passage, and
an EGR valve that adjusts a flow rate of exhaust gas flowing in from the exhaust passage into the intake passage through the EGR passage, the calculation process includes both of
a process of calculating the imbalance variable by having data obtained by the obtainment process when the flow rate of the exhaust gas flowing into the intake passage is zero as the input to the mapping, and a process of calculating the imbalance variable by having data obtained by the obtainment process when the flow rate of the exhaust gas flowing into the intake passage is greater than zero as the input to the mapping, and the response process is a process of, when the flow rate of the exhaust gas flowing into the intake passage is greater than zero, operating the predetermined hardware based on the imbalance variable calculated by having the data obtained by the obtainment process when the flow rate of the exhaust gas flowing into the intake passage is greater than zero as the input to the mapping.

20. The imbalance detection device according to claim 19, wherein the mapping data includes data learned by machine learning.

21. An imbalance detection device applied to a multi-cylinder internal combustion engine, the imbalance detection device comprising:

memory circuitry; and
processing circuitry, wherein
the memory circuitry is configured to store mapping data that is data defining a mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine, the processing circuitry is configured to execute
an obtainment process of obtaining the rotation waveform variable based on a detection value of a sensor that detects a rotational behavior of a crankshaft, and the air-fuel ratio detection variable in each of a plurality of first intervals, a calculation process of calculating the imbalance variable based on an output of the mapping having a value obtained by the obtainment process as the input, and a response process of operating predetermined hardware based on a calculation result of the calculation process to respond to a large degree of variations in the air-fuel ratio, the rotation waveform variable is a variable indicating a difference between instantaneous speed variables that are variables corresponding to a rotational speed of the crankshaft in each of a plurality of second intervals, the first interval and the second interval are both angular intervals of the crankshaft smaller than an appearance interval of a compression top dead center, the rotation waveform variables and the air-fuel ratio detection variables, which are inputs to the mapping, are respectively time series data within a predetermined angular interval larger than the appearance interval, the internal combustion engine includes
an EGR passage that connects an exhaust passage and an intake passage; and
an EGR valve that adjusts a flow rate of exhaust gas flowing in from the exhaust passage into the intake passage through the EGR passage, the calculation process includes both of
  a process of calculating the imbalance variable by having data obtained by the obtainment process when the flow rate of the exhaust gas flowing into the intake passage is zero as the input to the mapping, and calculating a first learned value from the imbalance variable and storing the first learned value: and
  a process of calculating the imbalance variable by having data obtained by the obtainment process when the flow rate of the exhaust gas flowing into the intake passage is greater than zero as the input to the mapping, and calculating a second learned value from the imbalance variable and storing the second learned value, and
the response process is a process of, when the flow rate of the exhaust gas flowing into the intake passage is zero, operating the predetermined hardware by selectively using the first learned value of the stored first learned value and second learned value.

22. The imbalance detection device according to claim 21, wherein the mapping data includes data learned by machine learning.

23. A data analysis device comprising:
second processing circuitry; and
memory circuitry, wherein
first processing circuitry, the second processing circuitry, and the memory circuitry configure an imbalance detection system, the imbalance detection system being applied to a multi-cylinder internal combustion engine,
the memory circuitry is configured to store mapping data that is data defining a mapping, the mapping constituting a machine learning algorithm, the mapping data including data learned by machine learning, the mapping including a neural network having an input-side nonlinear mapping that nonlinearly converts each output of an input-side linear mapping and an output-side nonlinear mapping that nonlinearly converts each output of an output-side linear mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine,
the first processing circuitry and the second processing circuitry are configured to execute
  an obtainment process of obtaining the rotation waveform variable based on a detection value of a sensor that detects a rotational behavior of a crankshaft, and the air-fuel ratio detection variable in each of a plurality of first intervals,
  a calculation process of calculating the imbalance variable based on an output of the mapping having a value obtained by the obtainment process as the input, and
  a response process of operating predetermined hardware based on a calculation result of the calculation process to respond to a large degree of variations in the air-fuel ratio,
the rotation waveform variable is a variable indicating a difference between instantaneous speed variables that are variables corresponding to a rotational speed of the crankshaft in each of a plurality of second intervals,
the first interval and the second interval are both angular intervals of the crankshaft smaller than an appearance interval of a compression top dead center,
the rotation waveform variables and the air-fuel ratio detection variables, which are inputs to the mapping, are respectively time series data within a predetermined angular interval larger than the appearance interval,
the first processing circuitry is mounted to a vehicle and is configured to execute
  the obtainment process,
  a vehicle-side transmission process for transmitting the data obtained by the obtainment process to the outside of the vehicle,
  a vehicle-side reception process for receiving a signal based on the calculation result of the calculation process, and
  the response process, and
the second processing circuitry is disposed outside the vehicle and is configured to execute
  an external reception process for receiving the data transmitted by the vehicle-side transmission process,
  the calculation process, and
  an external transmission process for transmitting a signal based on the calculation result of the calculation process to the vehicle.

24. A controller for an internal combustion engine, the controller comprising:
first processing circuitry, wherein
the first processing circuitry, second processing circuitry, and memory circuitry configure an imbalance detection system, the imbalance detection system being applied to a multi-cylinder internal combustion engine,
the memory circuitry is configured to store mapping data that is data defining a mapping, the mapping constituting a machine learning algorithm, the mapping data including data learned by machine learning, the mapping including a neural network having an input-side nonlinear mapping that nonlinearly converts each output of an input-side linear mapping and an output-side nonlinear mapping that nonlinearly converts each output of an output-side linear mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine,
the first processing circuitry and the second processing circuitry are configured to execute
  an obtainment process of obtaining the rotation waveform variable based on a detection value of a sensor that detects a rotational behavior of a crankshaft, and the air-fuel ratio detection variable in each of a plurality of first intervals,
  a calculation process of calculating the imbalance variable based on an output of the mapping having a value obtained by the obtainment process as the input, and
  a response process of operating predetermined hardware based on a calculation result of the calculation process to respond to a large degree of variations in the air-fuel ratio,
the rotation waveform variable is a variable indicating a difference between instantaneous speed variables that are variables corresponding to a rotational speed of the crankshaft in each of a plurality of second intervals, the first interval and the second interval are both angular intervals of the crankshaft smaller than an appearance interval of a compression top dead center, the rotation waveform variables and the air-fuel ratio detection variables, which are inputs to the mapping, are respectively time series data within a predetermined angular interval larger than the appearance interval, the first processing circuitry is mounted to a vehicle, and is configured to execute
- the obtainment process,
- a vehicle-side transmission process for transmitting the data obtained by the obtainment process to the outside of the vehicle,
- a vehicle-side reception process for receiving a signal based on the calculation result of the calculation process, and
- the response process, and the second processing circuitry is disposed outside the vehicle and is configured to execute
- an external reception process for receiving the data transmitted by the vehicle-side transmission process,
- the calculation process, and
- an external transmission process for transmitting a signal based on the calculation result of the calculation process to the vehicle.

25. An imbalance detection method applied to a multi-cylinder internal combustion engine, the imbalance detection method comprising:

storing mapping data that is data defining a mapping by memory circuitry, the mapping constituting a machine learning algorithm, the mapping data including data learned by machine learning, the mapping including a neural network having an input-side nonlinear mapping that nonlinearly converts each output of an input-side linear mapping and an output-side nonlinear mapping that nonlinearly converts each output of an output-side linear mapping, the mapping having a rotation waveform variable and an air-fuel ratio detection variable as an input, the air-fuel ratio detection variable being a variable corresponding to an output of an air-fuel ratio sensor in each of a plurality of first intervals, and the mapping outputting an imbalance variable that is a variable indicating a degree of variations in an air-fuel ratio of the internal combustion engine;

obtaining by an processing circuitry the rotation waveform variable based on a detection value of a sensor that detects a rotational behavior of a crankshaft, and the air-fuel ratio detection variable in each of a plurality of first intervals;

calculating the imbalance variable based on an output of the mapping having the rotation waveform and the air-fuel ratio detection variable as the input; and operating a predetermined hardware based on the imbalance variable to respond to a large degree of variations in the air-fuel ratio, wherein the rotation waveform variable is a variable indicating a difference between instantaneous speed variables that are variables corresponding to a rotational speed of the crankshaft in each of a plurality of second intervals, the first interval and the second interval are both angular intervals of the crankshaft smaller than an appearance interval of a compression top dead center, and the rotation waveform variables and the air-fuel ratio detection variables that are inputs to the mapping are respectively time series data within a predetermined angular interval larger than the appearance interval.

* * * * *

UNITED STATES PATENT AND TRADEMARK OFFICE
CERTIFICATE OF CORRECTION

| | | |
|---|---|---|
| PATENT NO. | : 11,225,924 B2 | Page 1 of 1 |
| APPLICATION NO. | : 16/785720 | |
| DATED | : January 18, 2022 | |
| INVENTOR(S) | : Harufumi Muto et al. | |

It is certified that error appears in the above-identified patent and that said Letters Patent is hereby corrected as shown below:

On the Title Page

Item (30), add:
--Foreign Application Priority Data
Feb. 21, 2019 (JP)..................... 2019-029400--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*